(12) United States Patent
Kikitsu et al.

(10) Patent No.: US 9,922,674 B2
(45) Date of Patent: Mar. 20, 2018

(54) MAGNETIC RECORDING AND REPRODUCING DEVICE AND MAGNETIC RECORDING AND REPRODUCING METHOD

(71) Applicant: KABUSHIKI KAISHA TOSHIBA, Tokyo (JP)

(72) Inventors: Akira Kikitsu, Kanagawa (JP); Tomoyuki Maeda, Kanagawa (JP); Masayuki Takagishi, Tokyo (JP); Kenichiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 14/736,759

(22) Filed: Jun. 11, 2015

(65) Prior Publication Data

US 2016/0012863 A1    Jan. 14, 2016

(30) Foreign Application Priority Data

Jul. 10, 2014    (JP) .................................. 2014-142696

(51) Int. Cl.
   *G11B 5/82* (2006.01)
   *G11B 5/74* (2006.01)
   (Continued)

(52) U.S. Cl.
   CPC .............. *G11B 5/746* (2013.01); *G11B 5/743* (2013.01); *G11B 5/82* (2013.01); *G11B 20/1217* (2013.01);
   (Continued)

(58) Field of Classification Search
   CPC .................................. G11B 5/743; G11B 5/82
   (Continued)

(56) References Cited

U.S. PATENT DOCUMENTS 7,502,188 B2 * 3/2009 Inomata .................... G11B 5/66
                                                          360/55
7,923,134 B2 * 4/2011 Ichihara ................. B82Y 10/00
                                                          216/22
(Continued)

FOREIGN PATENT DOCUMENTS

JP          7-161091          6/1995
JP          9-171644          6/1997
(Continued)

OTHER PUBLICATIONS

Notification of Reasons for Refusal issued by the Japanese Patent Office dated Mar. 28, 2017, for Japanese Patent Application No. 2014-142696, and English-language translation thereof.

*Primary Examiner* — Carlos E Garcia
(74) *Attorney, Agent, or Firm* — Finnegan, Henderson, Farabow, Garrett & Dunner, L.L.P.

(57) ABSTRACT

A magnetic recording and reproducing device according to an embodiment includes a magnetic recording medium and a controller. The magnetic recording medium includes in sequence a substrate, a storage layer, an exchange layer, and a surface recording layer. The controller executes following steps (1) to (6):

(1) magnetically recording first information on the surface recording layer;
(2) transferring the first information recorded on the surface recording layer to the storage layer;
(3) magnetically recording second information on the surface recording layer;
(4) magnetically reproducing the second information from the surface recording layer;
(5) transferring the first information recorded on the storage layer to the surface recording layer; and
(Continued)

(6) magnetically reproducing the first information transferred to the surface recording layer.

20 Claims, 15 Drawing Sheets

(51) Int. Cl.
*G11B 20/12* (2006.01)
*G11B 5/00* (2006.01)

(52) U.S. Cl.
CPC ............ *G11B 2005/0021* (2013.01); *G11B 2005/0024* (2013.01); *G11B 2220/235* (2013.01)

(58) Field of Classification Search
USPC .......................................... 360/135
See application file for complete search history.

(56) References Cited

U.S. PATENT DOCUMENTS

| | | | |
|---|---|---|---|
| 9,245,549 B2* | 1/2016 | Nishioka | G11B 5/3163 |
| 2003/0179658 A1 | 9/2003 | Shimazaki et al. | |
| 2005/0163962 A1 | 7/2005 | Kawato et al. | |
| 2006/0177702 A1 | 8/2006 | Ajan | |
| 2008/0180839 A1 | 7/2008 | Mochizuki et al. | |
| 2009/0080109 A1 | 3/2009 | Fukuzawa et al. | |
| 2010/0110576 A1 | 5/2010 | Akagi et al. | |

FOREIGN PATENT DOCUMENTS

| | | |
|---|---|---|
| JP | 2000-20938 | 1/2000 |
| JP | 2001-229501 | 8/2001 |
| JP | 2003-317220 | 11/2003 |
| JP | 2005-209290 | 8/2005 |
| JP | 2006-244684 | 9/2006 |
| JP | 2008-176858 | 7/2008 |
| JP | 2009-80904 | 4/2009 |
| JP | 2009-245477 | 10/2009 |
| JP | 2010-108571 | 5/2010 |
| WO | WO 02/27713 A1 | 4/2002 |

* cited by examiner

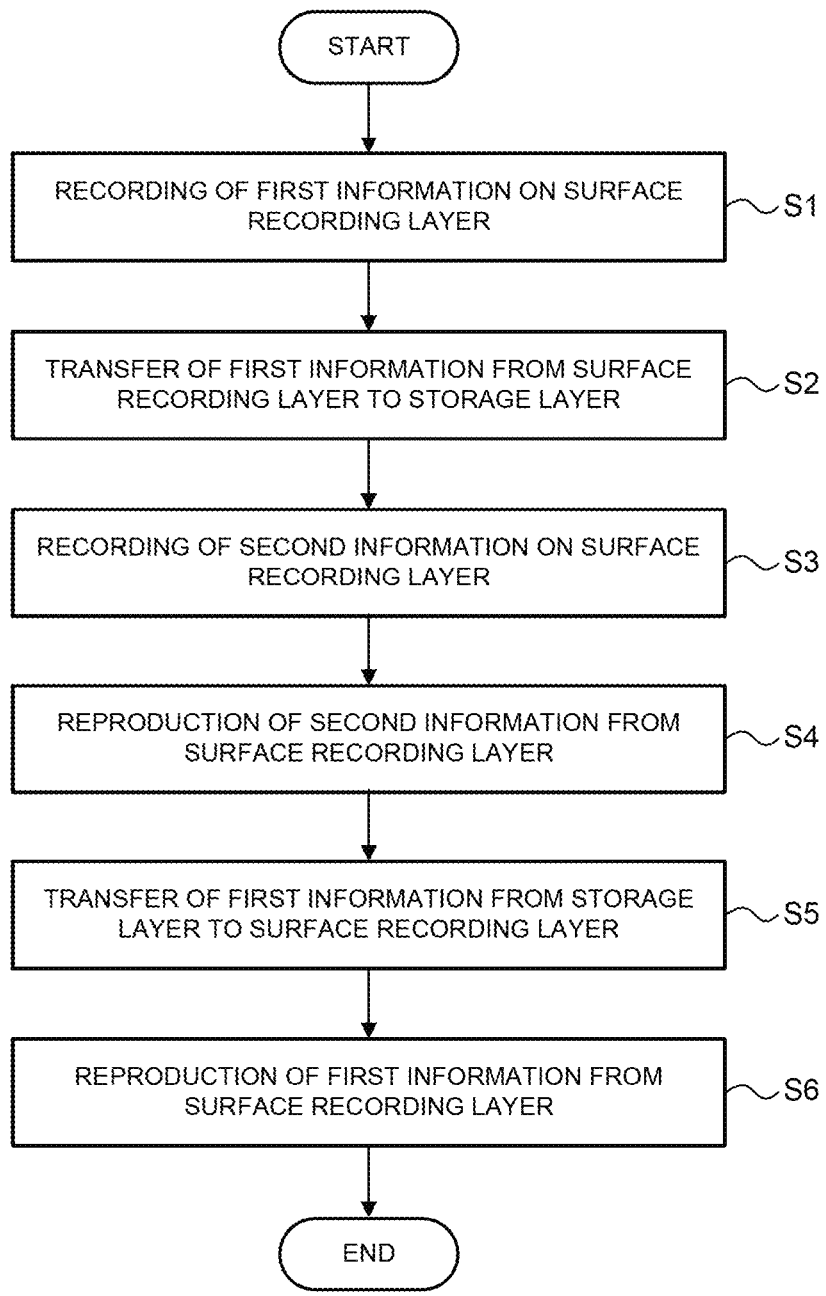

MAGNETIC RECORDING AND REPRODUCING DEVICE AND MAGNETIC RECORDING AND REPRODUCING METHOD

CROSS-REFERENCE TO RELATED APPLICATION

This application is based upon and claims the benefit of priority from Japanese Patent Application No. 2014-142696, filed on Jul. 10, 2014; the entire contents of which are incorporated herein by reference.

FIELD

Embodiments described herein relate generally to a magnetic recording and reproducing device and a magnetic recording and reproducing method.

BACKGROUND

In recent years, thermally assisted magnetic recording (TAMR) and microwave assisted magnetic recording (MAMR) are studied for improving the recording density of hard disk drive (HDD). Any of them uses a granular magnetic recording medium in which fine magnetic grains are surrounded by a non-magnetic matrix. Typically 10-20 magnetic grains constitute a recording unit (reversed magnetic domain) as 1 bit. However, when the magnetic grains are made finer so as to make the reversed magnetic domain smaller, they cause a problem of large deviation in magnetic properties. On the other hand, decreasing the number of magnetic grains per 1 bit to make the reversed magnetic domain smaller has a problem of small signal to noise ratio (SNR). These problems make it difficult to increase the recording density by using TAMR and MAMR technologies.

A technique called three-dimensional recording or volume recording is studied to solve these problems. In the volume recording, the recording density per unit area is increased by recording information along the film thickness direction as well as in-plane direction of the magnetic recording medium. That is, information is also recorded in the additional layers under the topmost recording layer.

However, the volume recording method has following three problems when it is applied to a current HDD system.

The first problem is low recording resolution.

High density magnetic recording on the granular medium needs narrow magnetization transition region, which is an interface between two magnetic domains. Therefore, a recording magnetic field generated by a recording magnetic pole needs to be steeply decreased along down track direction (needs to have large magnetic field gradient).

Generally, the magnetic field gradient decreases with increasing a distance from the recording magnetic pole along the film thickness direction. Therefore, current HDD system is designed to have the recording layer as thin as possible and the flying height (distance between the recording head and the medium) as small as possible in order to make magnetic field gradient as large as possible. For the case of the conventional volume recording, high density recording can be achieved only on the topmost layer close to the recording magnetic pole, but is difficult on underlying layers far from the recording magnetic pole. The storage capacity of the whole magnetic recording medium can be increased to some extent but not by twice compare to the case of current single layer recording.

This problem can be solved to some extent by using a bit-patterned recording medium with multilayer structure. In the bit-patterned medium, the recording layer is etched into a magnetic dot having a size of 1 bit. Since it is not necessary to form the magnetization transition by the recording magnetic field, high density recording is achieved even in the underlying layers where the magnetic field gradient is not so large.

However, low magnetic field gradient increases the probability of accidental reversal of adjacent dots, and therefore the problem cannot be completely solved.

The second problem is low reproduction resolution.

In principle, a leakage magnetic field from each bit on the recording medium decreases in intensity with distance from the recording magnetic medium, and also the change in the magnetic field intensity on the magnetization transition region decreases with distance. In other words, a spatially blur reproduced signal is generated.

This phenomenon is a fundamental property as in the case of the recording magnetic field. Accordingly, current HDD system requires recording layer as thin as possible and the flying height as small as possible. Therefore, as in the case of the first problem, high density reproduction can be achieved only on the topmost layer close to the reproducing head for the current volume recording system.

This problem cannot be solved even using the bit-patterned medium. No matter how clearly the magnetization is spatially changed in underlying layers of the bit-patterned medium, it is recognized as a blur spatial magnetization change by the reproducing head far from it.

The third problem is a decrease in signal intensity due to the superimposing of multiple magnetization states.

Assume that a volume recording medium is composed of two layers (first layer and second layer) and a magnetization of the first layer is M1 and its thickness is t1, a magnetization of the second layer is M2 and its thickness is t2, and $M1 \times t1 \neq M2 \times t2$. When the combination of directions of the magnetizations of the first layer and the second layer are (up, up), (up, down), (down, up), (down, down), reproduced signal intensity is proportional to $M1 \times t1 + M2 \times t2$, $M1 \times t1 - M2 \times t2$, $-M1 \times t1 + M2 \times t2$, $-M1 \times t1 - M2 \times t2$ respectively, and all of the cases can be distinguished by the amount of the reproduced signal in principle.

However, for the case of magnetized in different directions (the cases of $M1 \times t1 - M2 \times t2$ and $-M1 \times t1 + M2 \times t2$), the reproduced signal becomes lower than that in the case of conventional single layer recording. This means a decrease in SNR. High density recording is necessary just because the SNR in the conventional single layer recording reaches its lowest limit. High density recording technology that decreases SNR does not make sense. Furthermore, when the thickness of each layer is reduced to solve the aforementioned two problems (low recording resolution and low reproduction resolution), the problem of the low SNR becomes worse.

BRIEF DESCRIPTION OF THE DRAWINGS

FIG. 7 is a flowchart illustrating an example of a recording and reproducing procedure of a magnetic recording medium 121.

DETAILED DESCRIPTION

A magnetic recording and reproducing device according to an embodiment includes a magnetic recording medium and a controller configured to control recording and reproduction of information on/from the magnetic recording medium. The magnetic recording medium includes in sequence a substrate, a storage layer, an exchange layer, and a surface recording layer. The storage layer includes a first magnetic grain and a first non-magnetic matrix around the first magnetic grain, and the first magnetic grain has perpendicular magnetic anisotropy. The surface recording layer includes a second magnetic grain and a second non-magnetic matrix around the second magnetic grain, and the second magnetic grain has perpendicular magnetic anisotropy. Diameter of the first and second magnetic grains is 3 nm or more and 20 nm or less. The exchange layer includes a magnetic metal or a non-magnetic metal and has a function of exerting an exchange interaction between the storage layer and the surface recording layer.

A coercive force Hcr of the surface recording layer, an exchange field Hexr applied to the surface recording layer, an external magnetic field Har applied to the surface recording layer, a coercive force Hcs of the storage layer, an exchange field Hexs applied to the storage layer, and an external magnetic field Has applied to the storage layer, satisfy following conditions at room temperature, $Hcr > Hexr + Har$ $Hcs > Hexs + Has.$ The controller is configured to control executions of following steps (1) to (6):
(1) magnetically recording first information on the surface recording layer;
(2) transferring the first information recorded on the surface recording layer to the storage layer;
(3) magnetically recording second information on the surface recording layer;
(4) magnetically reproducing the second information from the surface recording layer;
(5) transferring the first information recorded on the storage layer to the surface recording layer; and
(6) magnetically reproducing the first information transferred to the surface recording layer.

Hereinafter, embodiments will be described in detail with reference to the drawings.

Figure 1:
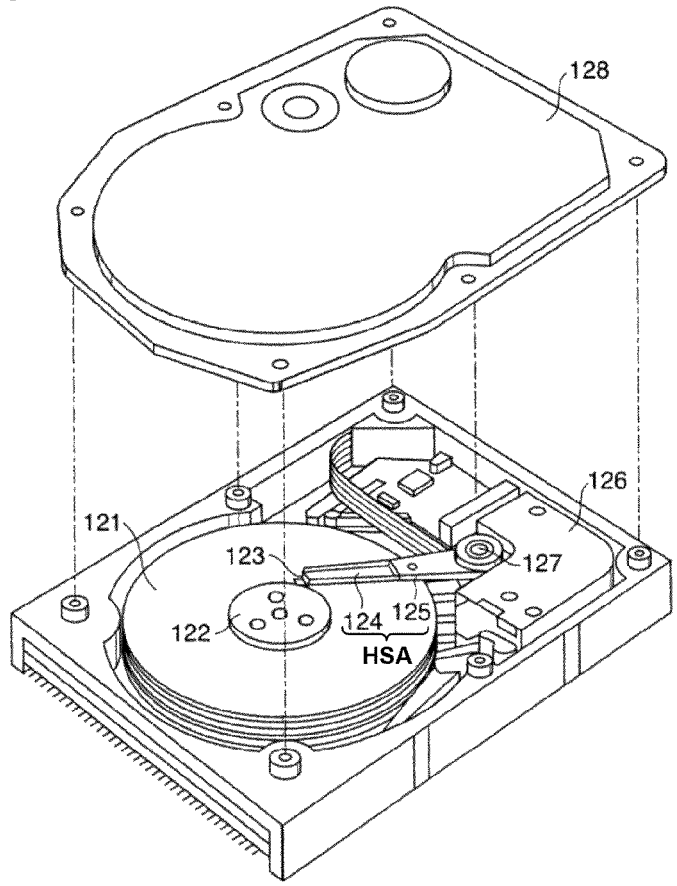
FIG. 1 is a schematic perspective view of an HDD device according to an embodiment.

A schematic perspective view of a magnetic recording and reproducing device according to an embodiment is illustrated in FIG. 1. This magnetic recording and reproducing device includes a magnetic recording medium 121, a magnetic head 123, a head suspension assembly HSA (a suspension 124 and an arm 125) on which the magnetic head 123 is mounted, and actuators 126 and 127 inside a casing 128.

The magnetic recording medium 121 is attached to a spindle motor 122 and rotated, and various kinds of digital data is recorded thereon by a perpendicular magnetic recording method. The magnetic head 123 is composed of a recording head and a reproducing head.

The recording head has a single-pole type structure generally used in perpendicular magnetic recording and sometimes has an auxiliary energy supply means for performing a thermally assisted magnetic recording or microwave assisted magnetic recording operation. Note that its details will be described later.

As the reproducing head, a generally used tunneling magnetoresistance (TMR) type reproducing element is used. However, other magnetoresistive elements may be used.

The recording head, the reproducing head, and the auxiliary energy supply means which is provided in some cases, are mounted on a common slider element that is provided at the tip of the HSA. Note that the details of the recording head and the reproducing head will be described later.

The HSA supports the magnetic head 123 to face a recording surface of the magnetic recording medium 121. The actuators 126 and 127 place (position) the magnetic head 123 at an arbitrary radial position of the magnetic recording medium 121 via the HSA by means of a voice coil motor (not illustrated). A circuit board (not illustrated) includes a head IC to processes recording and reproduction signals, and produces driving signals for the actuators 126 and 127, a control signal for controlling read/write of the magnetic head 123 and so on.

Figure 2:
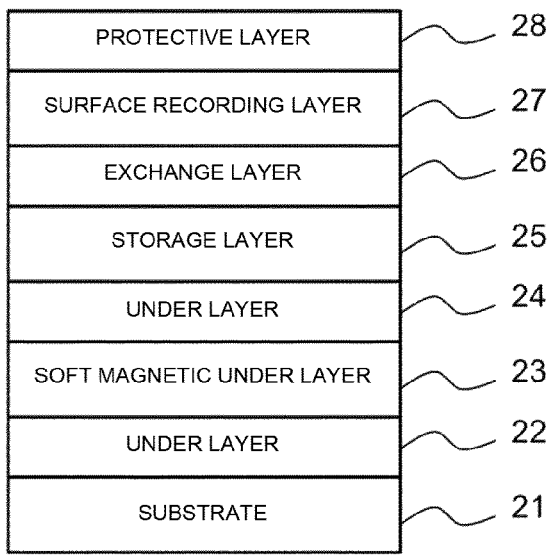
FIG. 2 is a schematic diagram of a stack structure of a magnetic recording medium used in a magnetic recording and reproducing method according to the embodiment.

A schematic diagram of the magnetic recording medium 121 according to the embodiment is illustrated in FIG. 2. The magnetic recording medium 121 has a substrate 21, under layers 22 and 24, a soft magnetic under layer 23, a storage layer 25, an exchange layer 26, a surface recording layer 27, a protective layer 28.

The magnetic recording medium 121 does not need to have all of the stacks form the substrate 21 to the protective layer 28. The magnetic recording medium 121 is at least composed of the substrate 21, the storage layer 25, the exchange layer 26, and the surface recording layer 27 which are stacked in order. Among them, the storage layer 25 and the surface recording layer 27 are perpendicular magnetized films having perpendicular magnetic anisotropy.

The substrate 21 is the one which is used in an ordinary perpendicular magnetic recording medium, such as a glass substrate, an Al alloy substrate, ceramic substrate, carbon substrate, Si single crystal substrate having oxidized surface, and the ones made by plating those substrates with NiP or the like.

The magnetic recording medium 121 may have the soft magnetic under layer 23. The soft magnetic under layer 23 is provided to pass a magnetic flux from the single-pole type head in the horizontal direction and return it back to the head. The soft magnetic under layer 23 helps to apply a steep and high perpendicular magnetic field to the storage layer 25 and the surface recording layer 27 to improve the recording and producing efficiency.

The soft magnetic under layer 23 is made of materials used in ordinary perpendicular magnetic recording medium, such as high magnetic permeability materials containing Fe, Ni and Co. In order to suppress noise due to formation of a magnetic domain, the soft magnetic under layer 23 may have a plurality of magnetic layers with Ru layer of 0.5 nm to 1.5 nm inserted therebetween for exerting antiferromagnetic coupling, or may be exchange-coupled to a hard magnetic layer or antiferromagnetic pinned layers. Note that the magnetization direction of the pinned layer (magnetization fixed layer) does not substantially change and is in a fixed state even if an external magnetic field is applied thereto.

The under layers 22 and 24 may be provided to control the quality of the soft magnetic under layer 23 and the storage layer 25, such as crystallinity, grain diameter, and adhesiveness. The under layer 22 and 24 may be composed of a plurality of layers and may contain any of metal, dielectric, or mixture of them. The surface of the under layer 22 and 24 may also be modified by ion irradiation, gas exposure or the like. The under layer 22 and 24 may be a magnetic layer.

The protective layer 28 is for preventing corrosion of the magnetic recording medium 121 and for preventing damage to the surface of the magnetic recording medium 121 when the magnetic head 123 comes into contact with the magnetic recording medium 121. Examples of its material include hard materials such as C, Si—O, Si—N. The thickness of the protective layer 28 is preferably 0.5 nm to 5 nm to reduce the distance between the magnetic head 123 and the magnetic recording medium 121.

A lubricant layer can be provided on the protective layer 28. The lubricant used for the lubricant layer is a conventional one, such as perfluoropolyether, alcohol fluoride, fluorinated carboxylic acid.

Each of the storage layer 25 and the surface recording layer 27 is the granular film similar to the one used in a current magnetic recording medium. More specifically, it is composed of magnetic grains having perpendicular magnetic anisotropy and a non-magnetic matrix surround the magnetic grains.

Figure 3:
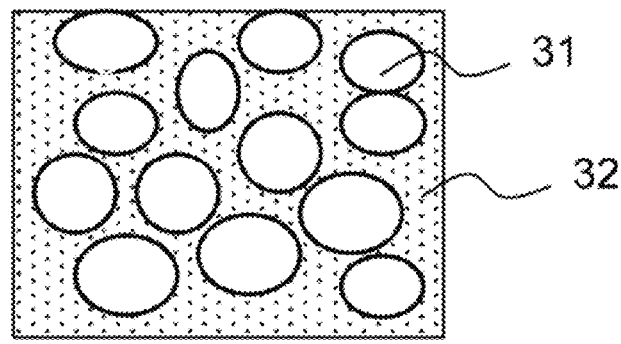
FIG. 3 is a schematic view of an in-plane structure of the magnetic recording medium used in the magnetic recording and reproducing method according to the embodiment.
Figure 4:
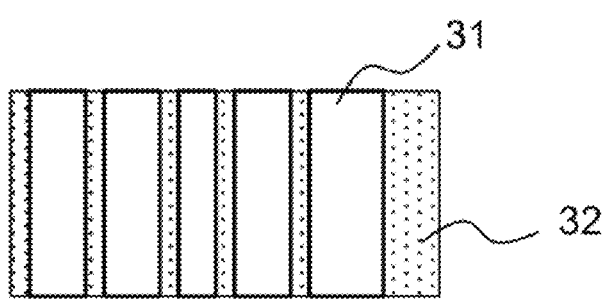
FIGS. 4 to 6 are schematic views of a cross-sectional structure of the magnetic recording medium used in the magnetic recording and reproducing method according to the embodiment.

Typical micro structure of each of the storage layer 25 and the surface recording layer 27 is illustrated in FIG. 3 and FIG. 4. FIG. 3 illustrates a planar micro structure, and FIG. 4 illustrates a cross-sectional micro structure. Columnar magnetic grains 31 are surrounded by a non-magnetic matrix 32. The magnetic grain 31 is generally a unit of magnetization reversal, and a plurality of the reversed magnetic grains form a recorded magnetic domain.

In the magnetic recording medium 121 according to the embodiment, the storage layer 25 and the surface recording layer 27 have the granular structure. The storage layer 25 and the surface recording layer 27 may have a so-called CGC (Continuous-Granular Coupled) structure as used in an ordinary perpendicular magnetic recording medium. The CGC structure has thin magnetic continuous films stacked on the granular film. The CGC medium structure is known to improve the recording performance. Even in the case of CGC structure, the magnetization reversal unit is the magnetic grain. Therefore, the CGC structure can be used for the magnetic recording medium 121 according to the embodiment.

Figure 5:
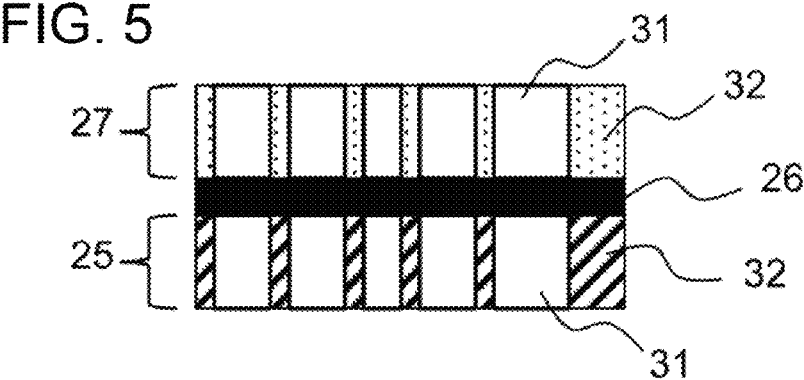

FIG. 5 illustrates a schematic view of a cross section of the magnetic recording medium 121 in which the storage layer 25, the exchange layer 26, and the surface recording layer 27 are stacked. Though the exchange layer 26 is illustrated as a continuous film, it may be a granular film so far as having a function of the later-described exchange layer 26.

Figure 6:
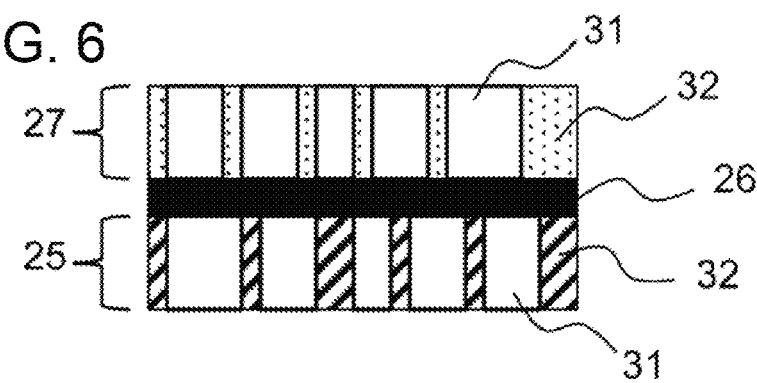

In FIG. 5, the positions of the magnetic grains in the storage layer 25 and the surface recording layer 27 are almost aligned. However, as illustrated in FIG. 6, the columnar structures are not necessary to be aligned between the storage layer 25 and the surface recording layer 27.

The average diameters of the magnetic grains 31 in the storage layer 25 and the surface recording layer 27 are preferably almost the same. It is not favorable that average diameter of the magnetic grains 31 differs by twice or more between the storage layer 25 and the surface recording layer 27 because later-described transfer of recorded information does not accurately take place.

The diameters of the magnetic grains 31 (first and second magnetic grains) in the storage layer 25 and the surface recording layer 27 are preferably 3 nm or more and 20 nm or less. When the diameter of the magnetic grain 31 is less than 3 nm, the non-magnetic matrix 32 occupies most parts of the storage layer 25 and the surface recording layer 27, resulting in the reduction of the reproduced signal. When the diameter of the magnetic grain 31 is more than 20 nm, the width of a later-described magnetization transition region 71 (magnetization transition width) becomes large, resulting in the low density recording.

As the material constituting the magnetic grain 31, the one used in an ordinary perpendicular magnetic recording medium can be used. A material composed of an alloy containing Co as a main component, for example, a CoPt alloy is preferable because of ability to obtain a high magnetic anisotropy (Ku). Further, an ordered-phase metal such as FePt or CoPt which attracts attention as a high-Ku material is also preferable.

The magnetic grain 31 can contain one or more kinds of elements selected from among B, Ta, Mo, Cu, Nd, W, Nb, Sm, Tb, Ru, and Re. Addition of these elements is effective for controlling the size and the crystallinity of magnetic grain 31 and for improving the magnetic properties of the magnetic recording medium 121 suitable for higher density recording.

As the material constituting the non-magnetic matrix 32, the one used in an ordinary perpendicular magnetic recording medium can be used. A material containing an oxide of metal or Si, for example, cobalt oxide, silicon oxide, titanium oxide or a mixture of them is preferable.

The thickness of each of the storage layer 25 and the surface recording layer 27 is preferably 2 nm to 30 nm. In this range, the above-described problems of decrease in recording resolution and reproduction resolution are less likely to occur. A thickness of 0.5 nm or less is unfavorable because it becomes difficult to constitute a thin film. The coercive force of each of the storage layer 25 and the surface recording layer 27 is 2 kOe or more.

The exchange layer 26 is disposed to induce and control an exchange coupling interaction between the storage layer 25 and the surface recording layer 27. The exchange layer 26 has a material and a film thickness capable of transmitting the exchange interaction between the storage layer 25 and the surface recording layer 27. This feature enables transfer (shift) of information between the storage layer 25 and the surface recording layer 27 as will be described later.

The exchange coupling interaction may be either ferromagnetic exchange coupling (ferro coupling: FC) or antiferromagnetic exchange coupling (antiferro coupling: AFC). In FC, total magnetic energy becomes lowest when the directions of spins in the storage layer 25 and the surface recording layer 27 are the same. In AFC, total magnetic energy becomes lowest when the directions of spins in the storage layer 25 and the surface recording layer 27 are antiparallel.

The FC can be induced by continuously forming the storage layer 25 and the surface recording layer 27 without breaking vacuum in a general medium manufacturing process by a sputtering method or the like.

The strength of FC can be controlled by inserting the exchange layer 26 at the interface between the storage layer 25 and the surface recording layer 27. The exchange layer 26 may be any of a surface modification (or a physical/chemical adsorption layer), a non-magnetic ultrathin layer, and a magnetic layer.

Since the exchange interaction exerts over a distance of about several nanometers in a vacuum, the thickness of the exchange layer 26 is preferably several nanometers or less. When the exchange layer 26 is a magnetic layer, thicker exchange layer 26 can be used, since the exchange coupling acts in a longer distance. The exchange layer 26 may be composed of a plurality of layers.

To induce AFC, the exchange layer 26 is composed of Ru, Re, Rh, Ir and its thickness is about 1.5 nm or less. In this case, the intensity of AFC interaction as well as FC interaction (negative AFC) can be controlled by the thickness of the exchange layer 26. It is known that the largest AFC can be obtained with a thickness of about 0.8 nm and FC can be obtained with a thickness of about 0.4 nm though these thickness values depends on the material and fabrication process.

A volume recording and reproducing method using the above magnetic recording medium 121 will be described.

FIG. 7 is a flowchart illustrating an example of a recording and reproducing procedure of the magnetic recording medium 121. Information is recorded on and reproduced from the magnetic recording medium 121 as following steps under the control of a later-described recording and reproducing controller 142 (controller).

A. Recording of first information on the surface recording layer 27 (Step S1)
B. Transfer of the first information from the surface recording layer 27 to the storage layer 25 (Step S2)
C. Recording of second information on the surface recording layer 27 (Step S3)
D. Reproduction of the second information from the surface recording layer 27 (Step S4)
E. Transfer of the first information from the storage layer 25 to the surface recording layer 27 (Step S5)
F. Reproduction of the first information from the surface recording layer 27 (Step S6)

As described above, recording on and reproducing from the storage layer 25 is performed via the surface recording layer 27, and the recording on and reproducing from the surface recording layer 27 is performed thereafter.

Hereinafter, its details will be described.

Figures from FIG. 8A to FIG. 8G schematically illustrate changes of the magnetic state of the magnetic recording medium 121 corresponding to the procedure in FIG. 7. This magnetic recording medium 121 has the storage layer 25, the exchange layer 26, and the surface recording layer 27 which are stacked in order, and the storage layer 25 and the surface recording layer 27 have the above-described granular structure.

To schematically illustrate the granular structure, magnetic grains 73 of the storage layer 25 and magnetic grains 72 of the surface recording layer 27 are illustrated in box shapes, and the direction of magnetization of each magnetic grain is indicated with a direction of an arrow therein.

The FC exchange coupling interaction exerts between the surface recording layer 27 and the storage layer 25 via the exchange layer 26.

Figure 9:
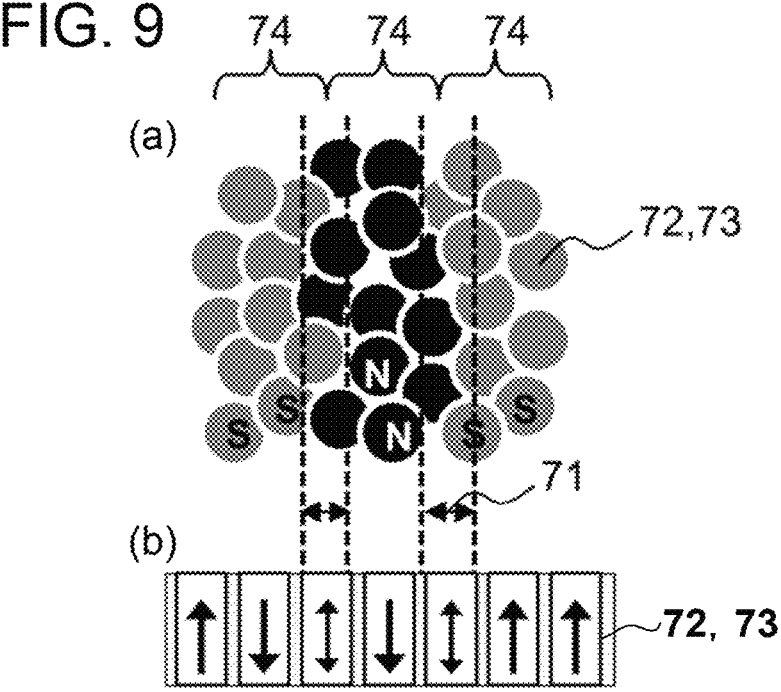
FIG. 9 is a view illustrating the relationship between the schematic view of a cross section of a surface recording layer 27 and a storage layer 25 and an in-plane structure of the magnetic layer having a granular structure.

FIG. 9 schematically illustrates the relationship between the cross sectional structure and in-plane structure of the surface recording layer 27 or the storage layer 25. Both of the storage layer 25 and the surface recording layer 27 are granular films so that the in-plane structure of each of the magnetic layers is composed of the magnetic grains 72 or 73 and the non-magnetic matrix filling the space between them as schematically illustrated in (a) (plan view) of FIG. 9. When information is recorded on the surface recording layer 27 or the storage layer 25, magnetic domains 74 which are magnetized in directions of downward (S) or upward (N) are formed. An example of an array of magnetic domains of S, N and S is illustrated in (a) of FIG. 9.

The arrangement of the magnetic domains 74 shown in FIG. 9 (a) represents the information of, for example, "1", "0", "1". The magnetization transition region (transition) 71 where the magnetization direction changes to the opposite direction exists between the magnetic domains 74. In FIG. 8A to FIG. 8G and FIG. 9 (b) (cross-sectional view), the magnetization transition region 71 is indicated with a symbol of an up-down arrow in a box. As illustrated in FIG. 9 (a), the magnetization transition region 71 consists of a plurality of magnetic grains 72 and 73 magnetized upward or downward. Note that each magnetic grain 72 and 73 has the magnetization in an upward or downward state even in the magnetization transition region 71. Therefore, in a transfer step explained below, the magnetic grain 72 and 73 in the magnetization transition region 71 behaves the same way as that of in the magnetic domain 74.

A. Recording of First Information on the Surface Recording Layer 27 (Step S1, FIG. 8A, FIG. 8B)

Figure 8A:
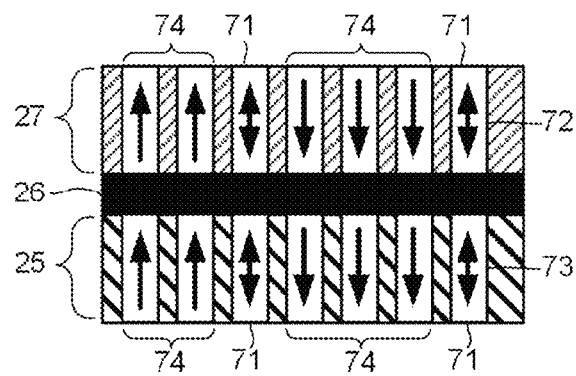
FIG. 8A to FIG. 8G are views schematically illustrating the state of spins in the magnetic recording medium for the recording and reproducing procedure in FIG. 7.

FIG. 8A shows an initial state. The initial state can take any state but here, the same magnetic domain 74 is set in the storage layer 25 and the surface recording layer 27 for the purpose of easy explanation. As described above, the magnetization transition region 71 is indicated with an up-down arrow.

Figure 8B:
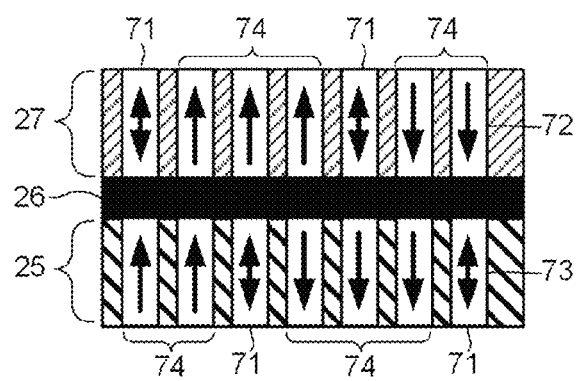

FIG. 8B illustrates a magnetic state when information is recorded on the surface recording layer 27 with the state of FIG. 8A by a conventional perpendicular magnetic recording head. The magnetization reversal (magnetic domain formation) occurs only in the surface recording layer 27, and the magnetization transition is formed at a new position as illustrated in FIG. 8B.

This state can be realized by satisfying the following expression (1) in a recording process.

$$Hcr < Hexr + Har$$

$$Hcs > Hexs + Has \quad \text{Expression (1)}$$

Hcr: coercive force of the surface recording layer 27

Hexr: exchange field applied to the surface recording layer 27

Har: external magnetic field applied to the surface recording layer 27 (total sum of magnetic field applied from the write head, leakage magnetic field, and other magnetic field applied to the surface recording layer 27)

Hcs: coercive force of the storage layer 25

Hexs: exchange field applied to the storage layer 25

Has: external magnetic field applied to the storage layer 25 (total sum of magnetic field applied from the write head, leakage magnetic field, and any other magnetic field applied to the storage layer)

As described before, the recording magnetic field in the layer close to the write head is large (Har>Has). Accordingly, the condition of the magnetic properties of the surface recording layer 27, the exchange layer 26, and the storage layer 25 for inverting only the surface recording layer 27 is the following expression (2).

$$Hcr + Hexr < Hcs + Hexs \quad \text{Expression (2)}$$

The recorded state shown in FIG. 8B should be held after the local magnetic field from the write head is removed. This state can be realized by satisfying the following expression (3) at room temperature or at the temperature at which the information is stored.

$$Hcr > Hexr + Har$$

$$Hcs > Hexs + Has \quad \text{Expression (3)}$$

The conditions of the expression (3) is confirmed, for example, by checking a hysteresis loop of the surface recording layer 27 and the storage layer 25 at room temperature.

Figure 10:
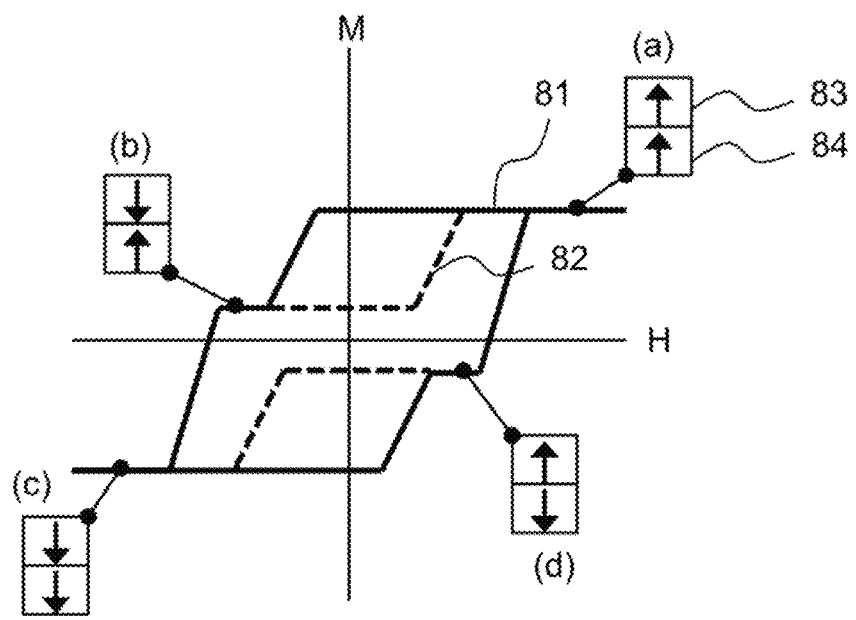
FIG. 10 is a view illustrating an example of a hysteresis loop of the magnetic recording medium used for the magnetic recording and reproducing method according to the embodiment.

An example of the hysteresis loop is illustrated in FIG. 10. In this chart, a solid line 81 is a major loop and a dotted line 82 is a minor loop. The minor loop 82 is obtained as follows. First, a strong magnetic field is applied to upward direction to achieve a magnetic state (a), then the magnetic field is decreased to zero and then increased to downward direction to obtain a magnetic state (b). Thereafter, the downward magnetic field is decreased to zero and then increased to upward direction back into the state (a).

Arrows 83 and 84 schematically show the magnetization direction of the surface recording layer 27 and the storage layer 25 respectively.

Since a strong upward external magnetic field is applied in the state (a), magnetizations of both the surface recording layer 27 and the storage layer 25 are directed upward. At the state (b), only the surface recording layer 27 is reversed by an intermediate downward magnetic field. State (b) changes to state (a) again by increasing the magnetic field upward via a locus of the minor loop 82. This means that the state (a) and the state (b) coexist under a zero external magnetic field. In other words, it is possible to change the direction of the magnetization of only the surface recording layer 27 to an arbitrary direction (up or down) without changing the magnetization state of the storage layer 25. As a result, different information can be recorded on the storage layer 25 from that stored in the surface recording layer 27.

This means that recording only on the surface recording layer 27 can be realized by changing the direction of the external magnetic field, that is, a magnetic field from the recording head.

This situation is also holds for the case where the magnetization of the storage layer 25 is downward. As illustrated in FIG. 10, the major loop 81 and the minor loop 82 are point-symmetric about a point of M=0, H=0. The state (c) in FIG. 10 (magnetizations of both the surface recording layer 27 and the storage layer 25 are downward) is obtained by a large external field of downward direction. When the magnetic field reduced and then increased to upward direction, a state (d) in FIG. 10 (only the surface recording layer 27 is reversed upward in magnetization) is obtained. When the upward magnetic field is decreased therefrom and then increased downward to the state (c), the minor loop 82 is drawn. As in the case of the state (a) and the state (b), the state (c) and the state (d) in FIG. 10 can coexist under a zero external magnetic field.

The fact that the four states of (a), (b), (c), (d) in FIG. 10 can be held under the zero magnetic field means that information can be saved on the surface recording layer 27 by the magnetic field from the recording head independent of the magnetization state on the storage layer 25 as schematically illustrated in FIG. 8B. This means higher recording density per unit area than that on the ordinary magnetic recording medium.

B. Transfer of the First Information from the Surface Recording Layer 27 to the Storage Layer 25 (Step S2, FIG. 8C, FIG. 8D)

Next, a transfer recording step will be described.

Figure 8C:
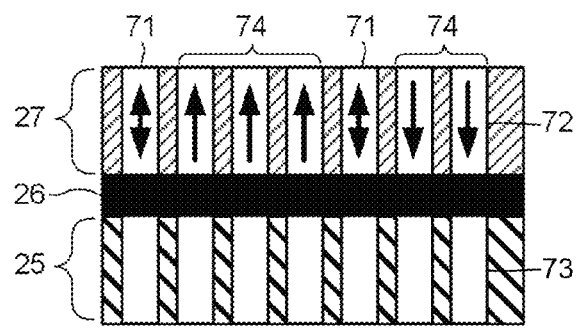

At the state of FIG. 8B, an external field other than the magnetic field from the recording head is applied, and it effectively reduces the coercive force of the storage layer 25 (see FIG. 8C).

In FIG. 8C, the direction of spin in the storage layer 25 is not indicated. This schematically illustrates that the storage layer 25 is at a state where its magnetization is easily reversed due to the reduction of its coercive force.

Figure 8D:
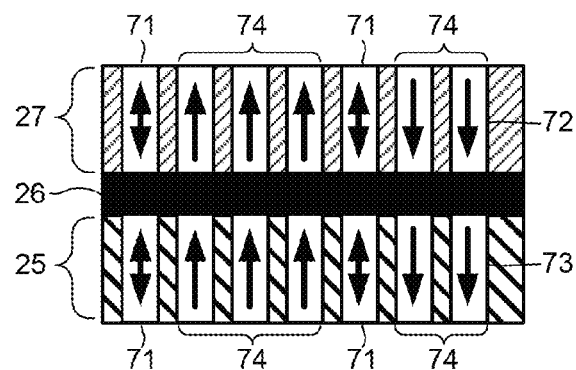

In this situation, FC exchange coupling acts on the magnetic grains 73 in the storage layer 25 via the exchange layer 26 from the surface recording layer 27. Therefore, the magnetization of the magnetic grains 73 in the storage layer 25 is reversed to the same direction as that of the magnetic grains 72 in the surface recording layer 27. Then, after the above-mentioned external field other than the recording magnetic field is removed, the magnetization state illustrated in FIG. 8D is achieved. This means that the magnetization state of the surface recording layer 27 is transferred to the storage layer 25.

As described above, this transfer step occurs for every magnetic grain 73 in the storage layer 25. In the magnetization transition region 71, the transfer step occurs at each grain magnetized in an arbitrary (up or down) direction. Therefore, magnetization state in the magnetization transition region 71 of the surface recording layer 27 is completely transferred to the storage layer 25. As a result, the width of the magnetization transition region 71 (magnetization transition width) in the storage layer 25 is the same as that in the surface recording layer 27. As described before, in the conventional volume/multilayer magnetic recording, the magnetization reversal of each magnetic layer is performed only with the magnetic field from the recording head. Therefore, the magnetization transition width of the magnetic layer located at far from the write head (the storage layer 25 in this embodiment) increases. This is the write resolution problem. However, in the magnetic recording method according to this embodiment, the magnetization transition of the storage layer 25 is formed by the magnetization transfer at each magnetic grain, and therefore the write resolution problem can be solved.

Timing to apply the transfer recording step can be arbitrarily set according to the request from the system. For example, the transfer recording step may be applied subsequent to the recording process for the surface recording layer 27. Alternatively, the transfer recording step may be applied during the idling state when the access to the magnetic recording and reproducing device is not busy. Alternatively, the transfer recording step may be applied just before the recording step of new information on the surface recording layer when the next recording request is received.

C. Recording of Second Information on the Surface Recording Layer 27 (Step S3, FIG. 8E)

As described in the Step S1, after the transfer recording step, arbitrary information can be recorded on the surface recording layer 27 without destroying the information transferred to the storage layer 25. As a result, the state of FIG. 8E, in which different information is recorded on the surface recording layer 27 and the storage layer 25, can be realized.

D. Reproduction of the Second Information from the Surface Recording Layer 27 (Step S4, FIG. 8E)

Next, a transfer reproduction step will be described.

In the magnetic recording and reproducing method according to the embodiment, the leakage magnetic field from the surface recording layer 27 is reproduced using a magneto-resistive sensor as in an ordinary magnetic recording device. In this case, it is necessary to design the system such that the information from the storage layer 25 cannot be reproduced or can be reproduced as a negligible small noise to the information from the surface recording layer 27.

As an example, the magnetization (M×t) of the storage layer 25 is set small (namely, the product of the magnetization M and the thickness t of the storage layer 25 is made smaller than that of the surface recording layer 27). Alternatively, the storage layer 25 can consist of two antiferromagnetically coupled magnetic layers and designed to make its total magnetization small. Since the storage layer 25 is located at a distance farther from the reproducing head than the surface recording layer 27, the leakage magnetic field from the storage layer 25 is essentially small. The exchange layer 26 may be made of a soft magnetic layer to have a function of shielding the leakage magnetic field from the storage layer 25. These examples may make the design margin of storage layer 25 wide.

E. Transfer of the First Information from the Storage Layer 25 to the Surface Recording Layer 27 (Step S5, FIG. 8F, FIG. 8G)

Figure 8E:
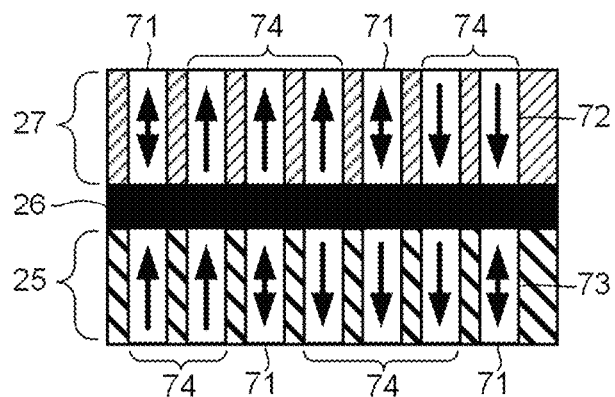

Magnetic state of FIG. 8E, in which different information are recorded on the surface recording layer 27 and the storage layer 25, is assumed to be the initial state. At this state, an external field other than the magnetic field from the recording head is applied, and it effectively reduces the coercive force of the surface recording layer 27. This state is illustrated in FIG. 8F.

Figure 8F:
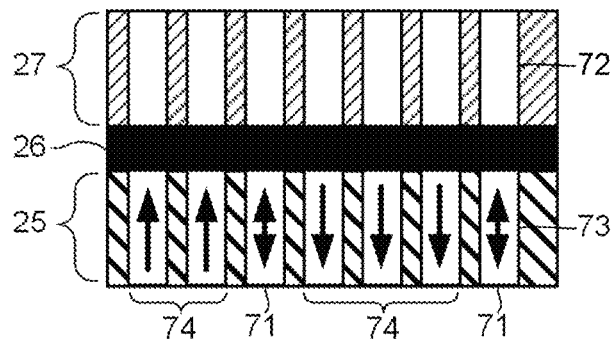

In FIG. 8F, the direction of spin in the surface recording layer 27 is not indicated. This schematically illustrates that the surface recording layer 27 is at a state where its magnetization is easily reversed due to the reduction of its coercive force.

Figure 8G:
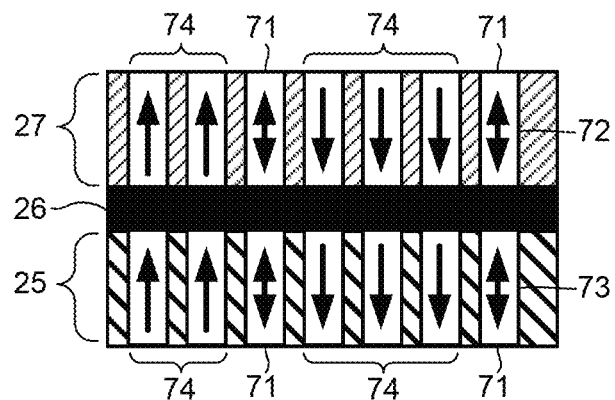

In this situation, FC exchange coupling acts on the magnetic grains 72 in the surface recording layer 27 via the exchange layer 26 from the storage layer 25. Therefore, the magnetization of the magnetic grains 72 in the surface recording layer 27 is reversed to the same direction as that of the magnetic grains 73 in the storage layer 25. Then, after the above-mentioned external field other than the recording magnetic field is removed, the magnetization state illustrated in FIG. 8G is achieved. This means that the magnetization state of the storage layer 25 is transferred to the surface recording layer 27.

As described above, this transfer step occurs for every magnetic grain 72 in the surface recording layer 27. In the magnetization transition region 71, the transfer step occurs at each magnetic grain magnetized in an arbitrary (up or down) direction. Therefore, magnetization state in the magnetization transition of the storage layer 25 is completely transferred to the surface recording layer 27. As a result, the magnetization transition width in the surface recording layer 27 is the same as that in the storage layer 25.

F. Reproduction of the First Information from the Surface Recording Layer 27 (Step S6)

In the magnetic recording and reproducing method according to the embodiment, the leakage magnetic field from the surface recording layer 27 is reproduced using a magneto-resistive sensor as in an ordinary magnetic recording device. In other words, the information transferred from the storage layer 25 to the surface recording layer 27 can be reproduced.

As described before, in the conventional volume/multilayer magnetic recording, the spatial resolution of the reproduced signal deteriorates for the magnetic layer located at a position far from the read head (the storage layer 25 in this embodiment). This is the read resolution problem. However, in the magnetic recording method according to the embodiment in which reproduction is performed after the magnetization transition in the storage layer 25 is transferred to the surface recording layer 27 closer to the read head, the reproduced signal has no deterioration in spatial resolution, and therefore the read resolution problem is solved.

Timing to apply the transfer reproduction step can be arbitrarily set according to the request from the system. For example, the transfer reproduction step may be applied just after the request for reproducing the information on the storage layer 25 is received. Previsioning the reproduction request on the storage layer 25 may be effective. The transfer reproduction step may be applied, for example, during the idling state when the access to the magnetic recording and reproducing device is not busy.

In the foregoing, recording and reproduction operation of the first information and the second information on/from the surface recording layer 27 and the storage layer 25 by the recording and reproducing controller 142 (controller) (described later using FIG. 28 and FIG. 29) has been described.

Here, the recording and reproducing controller 142 (controller) may perform recording and reproduction of information only on/from the surface recording layer 27. In other words, the controller 142 may perform conventional magnetic recording and reproducing operation, in which the first information is recorded on the surface recording layer 27 and reproduced from the surface recording layer 27 but neither transfer recording nor transfer reproduction is applied to the storage layer 25 (not recording the second information on surface recording layer 27).

In this case, the recording and reproducing controller 142 (controller) executes the following steps.
1) Step of magnetically recording third information on the surface recording layer 27.
2) Step of magnetically reproducing the third information from the surface recording layer 27.

As has been described above, three problems in the volume/multilayer magnetic recording are solved by using the magnetic recording medium 121, the magnetic recording method and the magnetic recording and reproducing method according to the embodiment. The problem of low recording resolution can be solved by high density magnetic recording on the surface recording layer 27 following its transfer to the storage layer 25. The problem of low reproduction resolution can be solved by reproducing the information from the surface recording layer 27 after its transfer from the storage layer 25. Since the reproduced signal comes almost from the magnetization state of the surface recording layer 27, the SNR reduction problem, which comes from the leakage field from additional layers, does not occur.

Foregoing description is for the case where the ferromagnetic exchange coupling (FC) exerted between the surface recording layer 27 and the storage layer 25 via the exchange layer 26. It is obvious that the volume recording according to the embodiment can be realized for the case where the antiferromagnetic coupling (AFC) exerts between the surface recording layer 27 and the storage layer 25 via the exchange layer 26. In this case, the mechanism shown in FIG. 8A to FIG. 8G does not change except for the direction of magnetization of the storage layer 25. The feature that the magnetization transition region can be transferred between the surface recording layer 27 and the storage layer 25 without increasing its size is also held.

In FIG. 8A to FIG. 8G the positions of the magnetic grains 72 and 73 of the surface recording layer 27 and the storage layer 25 are aligned with each other. However, the volume recording according to the embodiment can be realized even in a medium configuration as schematically illustrated in FIG. 6 in which the positions are not aligned with each other. Even in the case of FIG. 6, one-to-one transfer of the magnetization state as illustrated in FIG. 8A to FIG. 8G occurs in a pair of magnetic grains 31 in the relationship close to the one-to-one relationship as schematically illustrated in FIG. 5, and both the transfer recording step and the transfer reproduction step can be realized.

On the other hand, in the case where the center of the magnetic grain 72 of the surface recording layer 27 is located at a position between the magnetic grains 73 of the storage layer 25, neither the transfer recording step nor the transfer reproduction step cannot be realized. In the case where the intersection between the magnetic grains 72 and 73 is equal to or less than about a half of the cross-section of each of the magnetic grains 72 or 73, neither the transfer recording step nor the transfer reproduction step cannot be realized.

In the case of an intermediate positional state between well aligned and random aligned grains, the transfer recording step and the transfer reproduction step occur according to a probability distribution defined by external conditions such as the leakage magnetic field. When the average diameters and their distributions of the magnetic grains 72 and 73 of the surface recording layer 27 and the storage layer 25 are about the same, average value of the transferred magnetization transition width via the transfer recording step or the transfer reproduction step does not change. In short, a decrease in recording density does not occur both in the transfer recording step and the transfer reproduction step.

When the average diameters and their distributions of the magnetic grains 72 and 73 of the surface recording layer 27 and the storage layer 25 are not about the same, recording density of the volume recording according to the embodiment becomes a recording density of the layer having grains with a larger diameter or a larger diameter distribution. In the case where the average diameter or the diameter distribution of the grains in the storage layer 25 is larger, even if the high density recording is achieved on the surface recording layer 27, magnetization transition region transferred to the storage layer 25 becomes large. In other words, the recording resolution deteriorates to the level of that of the storage layer 25. Therefore, when the magnetization transition is transferred to the surface recording layer 27 in the transfer reproduction step, the recording resolution of the surface recording layer 27 becomes the same as the recording resolution of the storage layer 25. On the other hand, when the average diameter or the diameter distribution of the grains in the surface recording layer 27 is larger, information with low density is transferred to the storage layer 25 via transfer recording step even if the storage layer 25 has an ability of high density recording.

In any case, as long as the average diameters and their distributions of the magnetic grains 72 and 73 of the surface recording layer 27 and the storage layer 25 are not greatly different from each other, the recording density per unit area of the magnetic recording medium 121 can be improved more than the case where only the surface recording layer 27 or the storage layer 25 is used. Note that the average diameter and the diameter distribution of grains in each layer are designed based on the specifications of the magnetic recording device including the manufacturing cost.

In principle, the transfer recording and the transfer reproduction steps between the magnetic grains 72 of the surface recording layer 27 and the magnetic grains 73 of the storage layer 25 are possible when only the magnetostatic coupling is exerted between the surface recording layer 27 and the storage layer 25. However, it is difficult to apply magnetostatic interaction to this embodiment as explained below.

Figure 11:
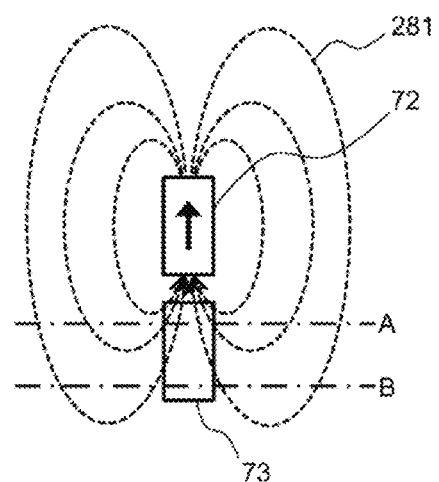
FIGS. 11 to 13 are views illustrating examples of a leakage magnetic field from the magnetic grain in the surface recording layer and the magnetic grain in the storage layer.

FIG. 11 schematically illustrates the magnetic grain 72 in the surface recording layer 27 and the magnetic grain 73 in the storage layer 25. A thick arrow indicates the direction of magnetization of the magnetic grain 72 in the surface recording layer 27. Since the magnetic grain is equivalent to a bar magnet, magnetization of the surface recording layer 27 generates magnetic flux lines 28 as illustrated in dotted arrows. The magnetic flux lines 281 are directed from an end portion to an end portion of the magnetic grain 72 as illustrated in FIG. 11. The magnetic field applied to the magnetic grain 73 of the storage layer 25 as a switching field corresponds to the density of the magnetic flux lines 281.

As is found in FIG. 11, the switching magnetic field intensity is different at the portion A and B (indicated with one-dotted chain lines). Therefore, in order to reverse the magnetization of the magnetic grain 73 of the storage layer 25, it is necessary to generate a larger leakage magnetic field (large number of magnetic flux lines) by increasing the magnetization of the surface recording layer 27. This increases the demagnetizing field of the magnetic grain 72 of the surface recording layer 27, and results in an unstable magnetization. A large leakage magnetic field acts also on adjacent magnetic grains and deteriorates the recorded information.

Figure 12:
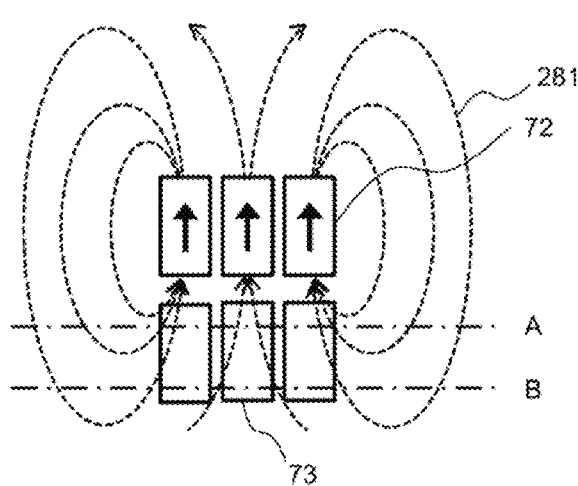

The situation shown in FIG. 11 is a case where the magnetic grains 72 and 73 solely exist in vacuum. However, many magnetic grains exist in the lateral direction in an actual magnetic recording medium. FIG. 12 illustrates an example of this case.

In FIG. 12, three magnetic grains 72 having magnetization in the same direction are arranged side by side in the surface recording layer 27. In this case, at the center magnetic grain 72, the density of the magnetic flux lines 281 decreases and the leakage magnetic field becomes smaller. This phenomenon becomes more conspicuous as the number of grains having magnetization in the same direction increases. The difference in leakage magnetic field between position A and position B of the magnetic grains 73 also increases. Furthermore, as is found from FIG. 12, the leakage magnetic field in the magnetic grain 73 of the storage layer 25 becomes asymmetric in the in-plane direction. Such a distribution of the intensity of the leakage magnetic field makes appropriate transfer of magnetization transition difficult.

Figure 13:
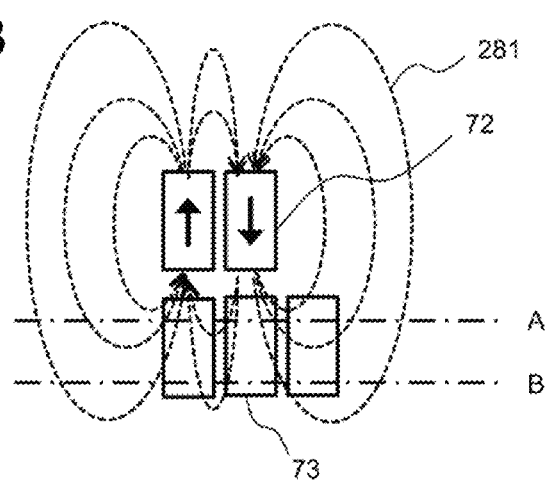

FIG. 13 illustrates the situation at the magnetization transition portion. To schematically illustrate magnetization transition, a state in which two magnetic grains 72 having magnetization in opposite directions is illustrated. In this situation, in the surface recording layer 27, the closed magnetic flux lines are achieved between the magnetic grains 72. Therefore, sufficient magnetic flux lines do not reach the magnetic grains 73 in the storage layer 25. This means that the leakage magnetic field to the magnetic grains 73 in the storage layer 25 becomes small. Further, the difference in magnetic field between the position A and the position B increases, and asymmetry in the magnetic field in the magnetic grains 73 of the storage layer 25 also increases. As described above, the magnetic recording in this embodiment needs to accurately transfer the magnetization transition between the surface recording layer 27 and the storage layer 25. However, it is difficult to accurately transfer the magnetization transition region in such cases where the leakage magnetic becomes non-uniform and where the leakage magnetic field at the magnetization transition region becomes small.

As described above, the magnetic recording in this embodiment is not sufficiently realized when the magnetostatic coupling is used for the transferring steps. However, the transfer step using magnetostatic coupling is effective in magneto-optical recording medium. In the magneto-optical recording medium, the size of a magnetic domain is as large as about 1 μm in diameter and the interval between the magnetic domains is as wide as several tens of nanometers or more. Therefore, the non-uniformity of the leakage magnetic field does not cause much trouble. Furthermore, in the magneto-optical recording, the recorded information is defined not at the magnetization transition position (the boundary between the magnetic domains) but at the position of the magnetic domain (mark position recording). Therefore, even if the leakage magnetic field is small and the magnetization transfer is not accurately performed at the boundary regions, influence to the recorded information is small.

From the above reason, the magnetization transfer steps using magnetostatic coupling can be used for magneto-optical recording but is difficult to be applied to magnetic recording using a granular thin film that is a target of this embodiment. As a matter of course, it is possible to utilize magnetostatic coupling for the purpose of assisting the magnetization transfer steps by exchange coupling. However, careful design is necessary for suppressing the influence of the magnetostatic coupling to the transfer of the magnetization transition region.

<Transfer Recording Method 1: Heating>

As the method of effectively reducing the coercive force of the storage layer 25 in the transfer recording step, a method of applying heat as the external field other than the magnetic field from the recording head can be employed. A Curie temperature of the surface recording layer 27 is set to be higher than a Curie temperature of the storage layer 25, and the magnetic recording medium 121 is heated to a temperature lower than the Curie temperature of the surface recording layer 27 in the transfer recording step into a state of FIG. 8C.

The magnetic recording medium 121 is designed so that the condition of the following expression (4) is satisfied during the heating process.

$$Hcs < Hexs + Has \qquad \text{Expression (4)}$$

Hexs: exchange field applied to the storage layer 25
Has: total sum of the leakage magnetic field and other magnetic field applied to the storage layer 25

Figure 14:
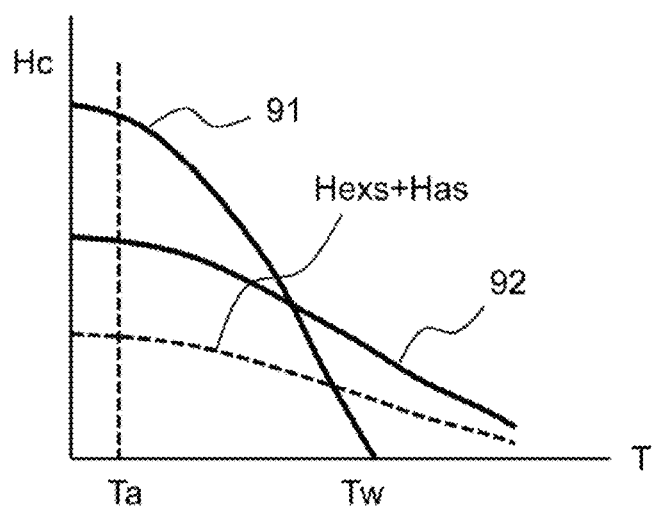
FIG. 14 is a chart illustrating an example of a temperature dependence of magnetization of each layer of the magnetic recording medium used in the magnetic recording and reproducing method according to the embodiment.

This situation can be realized by making the magnetic properties of the surface recording layer 27 and the storage layer 25, for example, as those shown in FIG. 14. FIG. 14 illustrates the dependence on the temperature (T) of the coercive force (Hc) of each layer. Curve 91 indicates the temperature dependence of the coercive force Hc of the storage layer 25, and curve 92 indicates the temperature dependence of the coercive force Hc of the surface recording layer 27. The temperature dependence of the total sum of the magnetic fields applied to the storage layer 25 is indicated with a dotted line (labeled as "Hexs+Has").

At room temperature Ta, the coercive force Hc of the storage layer 25 (Hcs) is larger than the total sum of the magnetic fields applied to the storage layer 25 (Hexs+Has). Therefore, the magnetization state in an arbitrary direction can be held. In short, information can be held.

Since the coercive force of the storage layer 25 (Hcs) is larger than the coercive force Hc of the surface recording layer 27 (Hcr), magnetization of only the surface recording layer 27 can be reversed as in FIG. 8B. In short, information can be recorded only on the surface recording layer 27.

When the magnetic recording medium 121 is heated close to a temperature Tw, the condition "Hcs<Hexs+Has" is satisfied, and the transfer recording step illustrated in FIG. 8C, FIG. 8D can be executed.

The temperature Tw may be higher or lower than the Curie temperature of the storage layer 25 as long as the condition "Hcs<Hexs+Has" is satisfied. However, making the temperature Tw higher than the Curie temperature of the surface recording layer 27 is unfavorable because magnetization reversal occurs also in the surface recording layer 27 by the leakage magnetic field.

<Variation of the Transfer Recording Method 1>

The width of a heated region of the magnetic recording medium 121 may be the same as or wider than a recording track width on the magnetic recording medium 121. If the width of the heated region is the same as the recording track width, the transfer recording step can be executed at each track, thus the random access to any track for recording information is possible. On the other hand, if a plurality of tracks is heated at the same time, the transfer recording step can be executed simultaneously, thus the total time for the information recording process is reduced. In this case, large heating element is easy to fabricate, and thereby it reduces the manufacturing cost of the magnetic recording and reproducing device.

<Transfer Recording Method 2: Microwave Assist>

As the method of effectively reducing the coercive force of the storage layer 25 in the transfer recording step, a method of applying a microwave magnetic field with a frequency close to a resonant frequency of the storage layer 25 as the external field other than the magnetic field from the recording head can be employed. This employs a so-called microwave assisted magnetic recording (MAMR) method.

When a microwave having a frequency slightly lower than the resonant frequency of the magnetic recording medium is applied to the magnetic recording medium 121, an effective switching field, namely, coercive force of the magnetic recording medium 121 can be reduced. In other words, a situation similar to that of heating the magnetic recording medium 121 to decrease Hc can be realized. Accordingly, by applying a microwave magnetic field with a frequency close to the resonant frequency of the storage layer 25 to satisfy the condition "Hcs<Hexs+Has", the transfer recording step according to the embodiment can be realized.

<Variation of the Transfer Recording Method 2>

The width of the region of the magnetic recording medium 121 where a microwave magnetic field is applied to may be the same as or wider than a recording track width. If the width of the region to which a microwave is applied is the same as the recording track width, the transfer recording step can be executed at each track, thus the random access to any track for recording information is possible. On the other hand, if a microwave magnetic field is applied to a plurality of tracks at the same time, the transfer recording step can be executed simultaneously, thus the total time for the information recording step is reduced. In this case, large microwave magnetic field generating element is easy to fabricate, and thereby it reduces the manufacturing cost of the magnetic recording and producing device.

<Transfer Reproduction Method 1: Microwave Assist>

As the method of reducing the coercive force of the surface recording layer 27 in the transfer reproduction step, a method of applying a microwave magnetic field with a frequency close to a resonant frequency of the surface recording layer 27 as the external field other than the magnetic field from the recording head can be employed. This employs a so-called microwave assisted magnetic recording (MAMR) method as in the above case. By applying a microwave magnetic field with a frequency close to the resonant frequency of the surface recording layer 27 to satisfy the condition "Hcr<Hexr+Har", the transfer reproduction step according to the embodiment can be realized.

<Variation of the Transfer Reproduction Method 1>

The width of the region of the magnetic recording medium 121 where a microwave magnetic field is applied to may be the same as or wider than a recording track width. If the width of the region to which a microwave is applied is the same as the recording track width, the transfer reproduction step can be executed at each track, thus the random access to any track for reproducing information is possible. On the other hand, if a microwave magnetic field is applied to a plurality of tracks at the same time, the transfer reproduction step can be executed simultaneously, thus the total time for the information reproduction process is reduced. In this case, large microwave magnetic field generating element is easy to fabricate, and thereby it reduces the manufacturing cost of the magnetic recording and producing device.

<Transfer Reproduction Method 2: In-Plane Magnetic Field>

To decrease the coercive force of the surface recording layer 27 in the transfer reproduction step, a magnetic field of 1 kOe or more can be applied in the in-plane direction of the magnetic recording medium 121 as the external field other than the magnetic field from the recording head.

The reason why the coercive force can be effectively reduced by applying the magnetic field in the in-plane direction to the perpendicular magnetization film will be described below.

Figure 15:
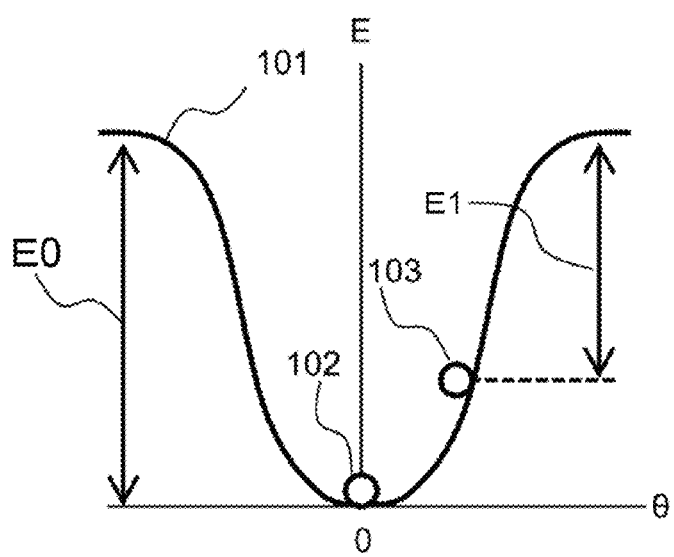
FIG. 15 is a chart for schematically explaining a magnetization reversal mechanism of the magnetic recording medium used in the magnetic recording and reproducing method according to the embodiment.

FIG. 15 schematically illustrates the relationship (graph 101) between the direction of the magnetization (angle $\theta$ between the axis perpendicular to a film) in the perpendicular magnetization film and a perpendicular magnetic anisotropy energy E. With no external magnetic field, the energy is in a lowest state 102. In order to reverse the magnetization, an external energy larger than E0 is necessary by applying exchange coupling force (exchange field) or an external magnetic field.

On the other hand, when a magnetic field is applied in the in-plane direction, the magnetization is directed at an angle (state 103) where the anisotropy energy and the external energy from the in-plane magnetic field balance with each other. In this case, it is necessary to apply energy E1 to reverse the magnetization. As is clear from FIG. 15, the energy E1 is lower than the energy E0. In other words, when a magnetic field is applied in the in-plane direction, the magnetization can be reversed with a smaller external field (energy).

Accordingly, when the exchange field from the storage layer 25 acts to the surface recording layer 27 to reverse the magnetization, if there is no external magnetic field, the magnetization reversal of the surface recording layer 27 does not occur because the coercive force of the surface recording layer 27 is larger than the exchange field as mentioned before. However, when an adequate in-plane magnetic field is applied, the surface recording layer 27 effectively reduces its coercive force and can be reversed by the exchange force from the storage layer 25. Then, as in FIG. 8G, the transfer reproduction step can be realized in which the magnetization state of the storage layer 25 is transferred to the surface recording layer 27.

Adequate intensity of the in-plane magnetic field relates to the specifications of the magnetic recording and reproducing device. However, design of the transfer reproduction step with the in-plane magnetic field of 1 kOe or more is effective to make the system robust against various magnetic disturbances from the outside.

<Variation of the Transfer Reproduction Method 2>

The width of the region of the magnetic recording medium 121 to which the in-plane magnetic field is applied may be the same as or wider than a recording track width. If the width of the region to which the in-plane magnetic field is applied is the same as the recording track width, transfer reproduction step can be executed at each track, thus the random access to any track for reproducing information is possible. On the other hand, if an in-plane magnetic field is applied to a plurality of tracks at the same time, the transfer reproduction step can be executed simultaneously, thus the total time for the information reproduction process is reduced. In this case, to fabricate a later-described in-plane magnetic field applying element in large size is easy, and thereby it reduces the manufacturing cost of the magnetic recording and producing device.

<Transfer and Reproducing Method 3: Heating>

As the method of reducing the coercive force of the surface recording layer 27 in the transfer reproduction step, a method of applying heat as the external field other than the magnetic field from the recording head can be employed. A Curie temperature of the storage layer 25 is set to be higher than a Curie temperature of the surface recording layer 27, and the magnetic recording medium 121 is heated to a temperature lower than the Curie temperature of the storage layer 25 in the transfer reproduction step into a state of FIG. 8F.

In this case, the condition of the following expression (5) is satisfied.

$$Hcr < Hexr + Har \qquad \text{Expression (5)}$$

Hcr: coercive force of the surface recording layer 27

Hexr: exchange field applied to the surface recording layer 27

Har: total sum of leakage magnetic field and other magnetic field applied to the storage layer 25

Figure 16:
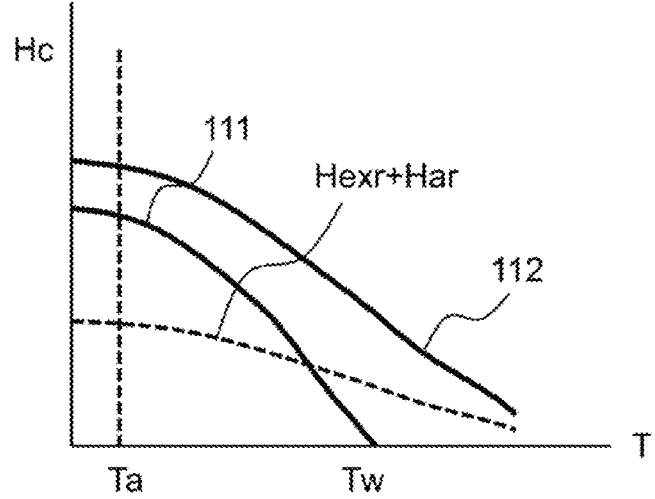
FIG. 16 is a chart illustrating an example of a temperature dependence of magnetization of each layer of the magnetic recording medium used in the magnetic recording and reproducing method according to the embodiment.

This situation can be realized by making the magnetic properties of the surface recording layer 27 and the storage layer 25, for example, as those shown in FIG. 16.

FIG. 16 illustrates the dependence on temperature (T) of Hc of each layer. Curve 111 indicates the temperature dependence of Hc of the surface recording layer 27, and curve 112 indicates the temperature dependence of Hc of the storage layer 25. The temperature dependence of the total sum of the magnetic fields applied to the surface recording layer 27 is indicated with a dotted line (labeled as "Hexr+Har").

At room temperature Ta, Hc of the surface recording layer 27 (Hcr) is larger than the total sum of the magnetic fields applied to the surface recording layer 27 (Hexr+Har). Therefore, an arbitrary magnetization state as illustrated in FIG. 8E can be held. Since Hcr is smaller than Hc of the storage layer 25 (Hcs), magnetization of only the surface recording layer 27 can be reversed as illustrated in FIG. 8B.

When the magnetic recording medium 121 is heated close to a temperature Tw, the condition "Hcr<Hexr+Har" is satisfied, and the transfer reproduction step illustrated in FIG. 8F to FIG. 8G occurs.

The temperature Tw may be higher or lower than the Curie temperature of the surface recording layer 27 as long as "Hcr<Hexr+Har" is satisfied. However, making the temperature Tw higher than the Curie temperature of the storage layer 25 is unfavorable because magnetization reversal occurs also in the storage layer 25 by the leakage magnetic field.

<Variation of the Transfer Reproduction Method 3>

The width of the heated region of the magnetic recording medium 121 may be the same as or wider than a recording track width. If the width of the heated region is the same as the recording track width, the transfer reproduction step can be executed at each track, thus the random access to any track for reproducing information is possible. On the other hand, if a plurality of tracks is heated at the same time, the transfer reproduction step executed simultaneously, thus the total time of the reproduction process is reduced. In this case, large heating element is easy to fabricate, and thereby it reduces the manufacturing cost of the magnetic recording and reproducing device.

<Transfer Recording Step and Transfer Reproduction Step by Additional Heads>

Aforementioned means for applying an external field other than the magnetic field from the recording head for the transfer recording step or the transfer reproduction step may be placed on the same HSA (the suspension 124 and the arm 125 in FIG. 1) as that where the recording and reproducing element is placed, or it may be placed on the a different HSA from that where the recording and reproducing element is placed. For the case of the same HSA, the manufacturing cost can be reduced. On the other hand, for the case of the different HSA, namely, different head, transfer recording step or transfer reproduction step can be executed at an arbitrary timing and at arbitrary place. In this case, manufacturing becomes easy. For the cease of different HSA, the operation scheme where the external field other than the recording magnetic field is applied to a wider region than the recording track width is suitable because its design margin is large.

In the foregoing, as means for applying an external field other the magnetic field from the recording head for performing the transfer recording step or the transfer reproduction step, heat, microwave and in-plane magnetic field have been described. For the magnetic recording and reproducing method according to the embodiment, possible combinations of the means for the (transfer recording step, transfer reproduction step) are (heat, microwave), (microwave, microwave), (microwave, heat), (heat, in-plane magnetic field), and (microwave, in-plane magnetic field). The combination (heat, heat) cannot be used in the embodiment because the design of Curie temperatures of the surface recording layer 27 and the storage layer 25 is impossible.

When the means for applying an external field other the magnetic field from the recording head is different between the transfer recording step and the transfer reproduction step, two different heads may be used for the transfer recording step and the transfer reproduction step respectively, in addition to the head for recording and reproduction. An additional head may have both means. Furthermore, all of them may be placed on one recording and reproducing head. Other combination is also possible.

The magnetic recording and reproducing device with three heads for recording and reproduction, the transfer recording step, and the transfer reproduction step are easy to assembling and has larger operation margin, however its assembling cost may increase. The magnetic recording and reproducing device with one head for the three means may be easy to assembling but the fabrication process of the head becomes complicated and difficult. In the case of with two heads, the situation is in the intermediate though it also has advantages and disadvantages. The head configuration including its number is determined based on the specifications of the magnetic recording and reproducing device.

<Recording Head>

Figure 17:
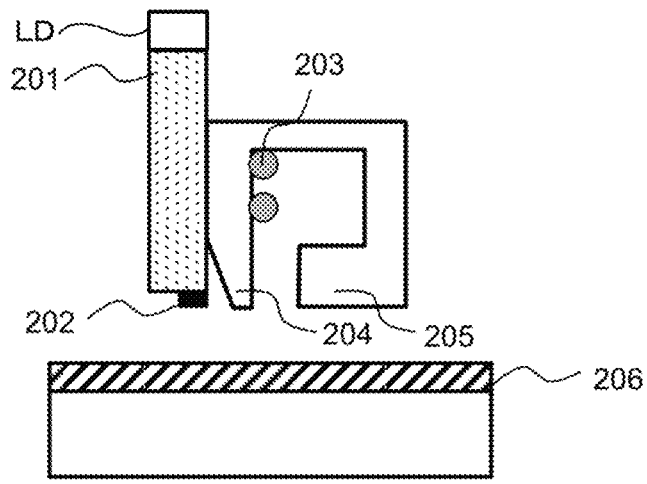
FIG. 17 is a view illustrating an example of a recording head.

An example of a recording head having a function that applies an external field other than the recording magnetic field according to the embodiment is described. FIG. 17 illustrates an example of the recording head with the heating function by the near-field light as the external field. The recording head has a semiconductor laser LD, a waveguide 201, a near-field element 202, an induction coil 203, a magnetic pole 204, and a return coil 205. The recording head is placed opposite to the surface of the recording layer 206.

The induction coil 203, the magnetic pole 204, and the return coil 205 have similar configurations to those of an ordinary perpendicular magnetic recording head. A pulse magnetic field with high intensity and large magnetic field gradient is generated under the recording magnetic pole 204 by applying a pulse current to the induction coil 203.

The semiconductor laser LD, the waveguide 201, and the near-field element 202 constitute a heating mechanism that heats the magnetic recording medium.

Light is guided from the semiconductor laser LD to a surface (medium surface) of the magnetic recording medium 121 via the waveguide 201 and the near-field element 202. The laser light irradiated to the near-field element 202 generates near-field light on the near-field element 202. The near-field light locally heats the magnetic recording medium 121.

Figure 18:
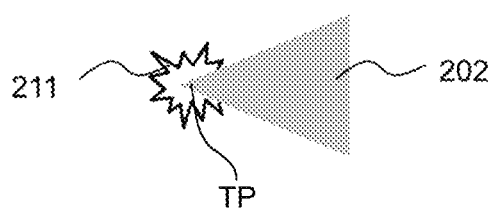
FIG. 18 is a schematic plan view of an example of a near-field element as viewed from the medium surface side.

FIG. 18 illustrates a schematic view (plan view) of an example of the near-field element 202 as viewed from the medium surface side. The near-field element 202 has a fine apex portion (tip portion TP) as illustrated in FIG. 18. The near-field element 202 is necessary to have the tip portion TP, therefore it can have a shape like a character "E" or a rod.

The near-field element 202, in particular, the tip portion TP is composed of fine particles or a thin film made of noble metals (for example, gold (Au) or silver (Ag)) or an alloy containing a noble metal.

The mechanism of heating the magnetic recording medium by irradiating the laser to the near-field element 202 is as follows. When the laser is irradiated to the near-field element 202, electrons in the near-field element 202 are excited and vibrated. The vibration of electrons (plasmons) causes electric near field at the surface of the element. The electric near field is concentrated at the tip portion TP, that is, electric near field with high intensity is localized at the TP. This is what is called near-field light 211. When the near-field element is placed at the vicinity of the magnetic recording medium, localized high energy is injected from the TP to the magnetic recording medium. Then, the small portion of the magnetic recording medium is heated.

The near-field element 202 can be used for the thermally assisted magnetic recording since it can heat the magnetic recording medium at around the size of TP. The recording head shown in FIG. 17 can be used to apply heat in a size of about the track width as the external field after the recording process on the surface recording layer 27.

Figure 19:
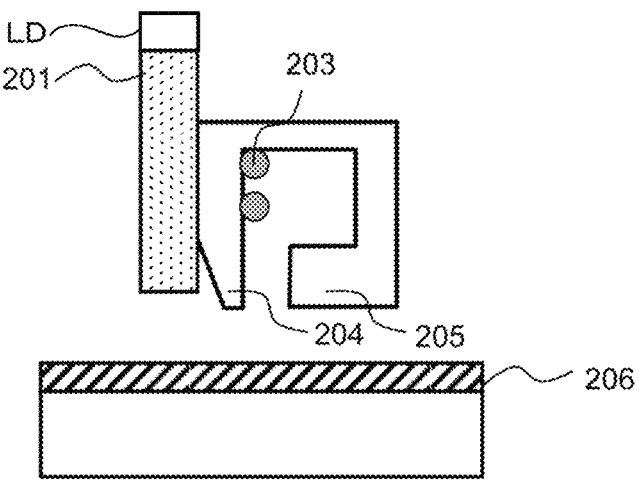
FIG. 19 is a view illustrating an example of the recording head.

FIG. 19 illustrates another example of the recording head having a function that applies heat as the external field other than the recording magnetic field.

In FIG. 19, the near-field element 202 is removed from the head in FIG. 17, and the semiconductor laser LD and the waveguide 201 consist the heating element that heats the magnetic recording medium.

The light emitted from the waveguide 201 is directly heats the recording layer 206. Since the size of a heating spot is about the width of the waveguide 201, the heating region is wide as compared to the case of FIG. 17. Accordingly, using the recording head shown in FIG. 19 can be used to heat a plurality of tracks at the same time as the external field after the recording process on the surface recording layer 27.

Figure 20:
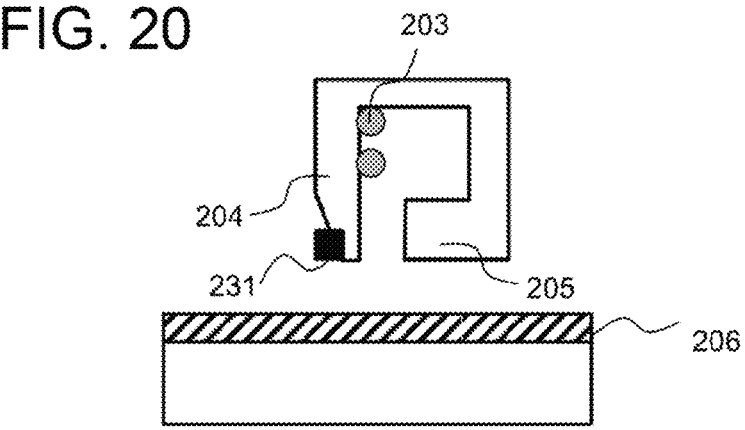
FIG. 20 is a view illustrating an example of the recording head.

FIG. 20 illustrates an example of the recording head in the case of using a microwave magnetic field as the external field. A microwave generating element 231 is placed beside the write pole 204 used in a conventional recording head.

Figure 21:
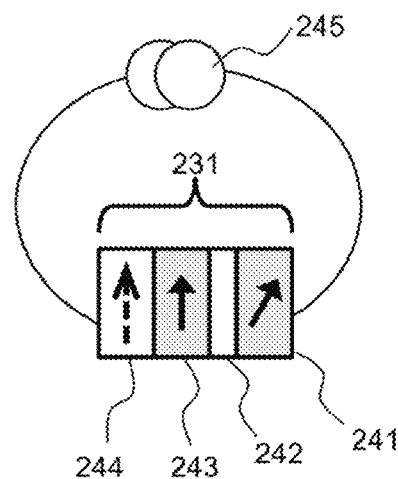
FIG. 21 is a view illustrating a structure of a microwave generating element.

The structure of the microwave generating element 231 is illustrated in FIG. 21. A free layer 241, a non-magnetic layer 242, a fixed layer 243, and a pinning bias layer 244 are stacked in this order.

The free layer 241 and the fixed layer 243 are magnetic thin films having soft magnetic properties, and are generally consisted of an alloy containing Fe, Co, Ni.

An antiferromagnetic film or a hard magnetic film is used for the pinning bias layer 244, in which the magnetized in is fixed to one direction. The fixed layer is magnetized in one direction by the exchange field from the pinning bias layer 244.

When current is supplied from a current source 245 to the microwave generating element 231, the magnetization of the free layer 241 starts to rotate by the torque from a spin-polarized current from the fixed layer 243. The rotation of the magnetization applies a microwave magnetic field to the recording layer 206.

The structure of the microwave generating element 231 is almost the same as the spin valve element generally used in the reproducing head. By placing the microwave generating element 231 between the write pole and the return magnetic pole, so-called microwave assisted recording is obtained.

When the width of the microwave generating element 231 is set to about the track width, it is possible to apply a microwave magnetic field to a region of about the track width. When the width of the microwave generating element 231 is set to about the width of a plurality of tacks, it is possible to apply a microwave magnetic field to a region of the plurality of tracks.

Figure 22:
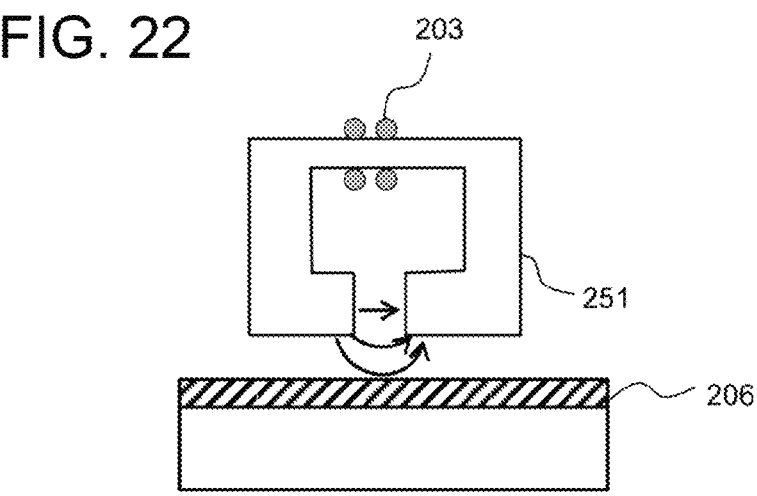
FIG. 22 is a view illustrating an example of the recording head.

FIG. 22 illustrates an example of the recording head that applies the in-plane magnetic field as the external field. A magnetic pole 251 has a symmetrical structure along the surface of the magnetic recording layer 206. By passing current through the induction coil 203, a magnetic field is applied in the in-plane direction of the magnetic recording medium from an end portion of the magnetic pole 251 to the recording layer 206 as indicated with arrows in the figure.

When the width of the magnetic pole 251 is set to about the track width, an in-plane magnetic field of about the track width can be applied. When the width of the magnetic pole 251 is set to larger than the track width, an in-plane magnetic field can be applied to a plurality of tracks at the same time.

Figure 23:
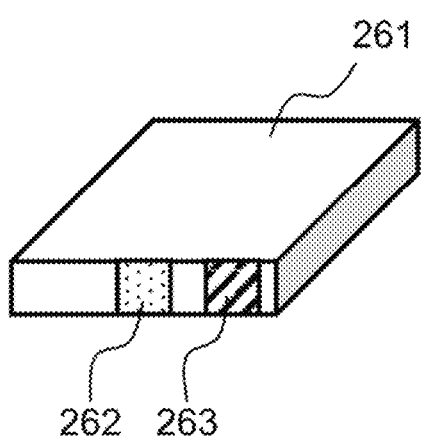
FIGS. 23 and 24 are views illustrating examples of using a plurality of recording heads.

FIG. 23 illustrates an example of using a plurality of recording heads (elements 262 and 263). As the elements 262 and 263, any two of the following elements can be selected; ordinary magnetic recording head element, the recording head element with the heating mechanism (see FIG. 17, FIG. 19), the heating element, the recording head element with the microwave applying mechanism (see FIG. 20), the microwave applying element (see FIG. 21), the in-plane magnetic field applying element (see FIG. 22).

These two elements 262 and 263 can be placed on a slider 261 constituting the magnetic head 123 in FIG. 1.

In FIG. 23, the lower side of the slider 261 is the medium surface (air bearing surface: ABS). The slider 261 is roughly rectangular and its ABS is processed in a special shape. This shape makes the slider 261 to float above the medium surface by airflow with a designed flying height.

The elements 262 and 263 are placed on an end face of the slider 261. It is preferable to place the element that has a function of recording the surface recording layer 27 (the ordinary magnetic recording head element, the recording head element with the heating mechanism, the recording head element with the microwave applying mechanism) at the position of the element 262 (the center of the slider 261) for the stable recording operation with small flying height.

Figure 24:
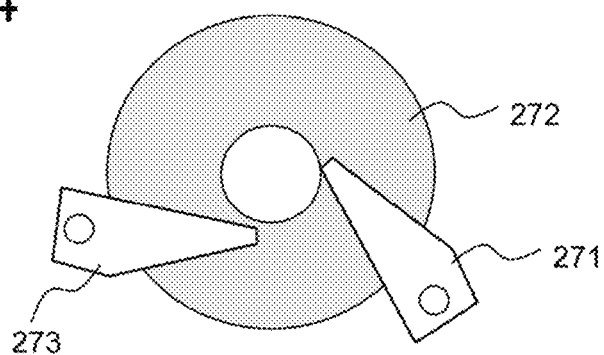

FIG. 24 illustrates another example of placing a plurality of recording heads. Two head suspension assemblies (HSAs) 271 and 273 are provided on a magnetic recording medium 272. Two of the following element is selected as the two HSAs 271 and 273; ordinary magnetic recording head element, the recording head element with the heating mechanism, the heating head element, the recording head element with the microwave applying mechanism, the microwave applying element, and the in-plane magnetic field applying element. This example may make the fabrication process of the recording head easy. When three elements are used for the magnetic recording and reproduction process, the recording transfer step, and the reproduction transfer step, respectively, the heads illustrated in FIG. 23 and FIG. 24 may be combined.

<Medium Configuration—Exchange Layer 1, Exchange Layer 1 Option>

In the magnetic recording medium 121 constituting the magnetic recording and reproducing device according to the embodiment, the exchange layer 26 can be a magnetic material containing at least one element among Fe, Co, Ni. In this case, ferromagnetic exchange coupling (FC) can be effectively induced.

Since the exchange layer 26 is a magnetic material, FC exchange coupling between the surface recording layer 27 and the storage layer 25 can be induced up to a thickness of about 10 nm In this case, since the magnetization is relatively easy to rotate within the exchange layer 26, interface exchange coupling energy when the magnetizations of the surface recording layer 27 and the storage layer 25 are opposite direction can be concentrated within the exchange layer 26. This reduces the energy difference between the cases when the magnetizations of the surface recording layer 27 and the storage layer 25 are parallel and when those are antiparallel, and increases the margin for magnetic properties for holding the recorded state shown in FIG. 8B.

The saturation magnetization of the exchange layer 26 may be 1000 emu/cc or more. In this case, the exchange layer 26 may also become a magnetic shield to reduce the leakage magnetic field from the recorded magnetic domain of the storage layer 25 to the reproducing head, and reduces the noise during reproduction process of the surface recording layer 27.

When information is recorded on the surface recording layer 27, the recording magnetic field applied to the storage layer 25 is reduced due to a similar shielding effect of the exchange layer 26. Therefore, the margin for medium design and for the recording operation is increased.

<Medium Configuration—Exchange Layer 2>

In the magnetic recording medium 121 constituting the magnetic recording and reproducing device according to the embodiment, the exchange layer 26 can be a non-magnetic material having a thickness of 1.5 nm or less and containing at least one element among Ru, Ir, Re, and Rh. In this case, ferromagnetic exchange coupling (FC) or antiferromagnetic coupling (AFC) can be induced according to the thickness of the exchange layer 26. It is known that the exchange coupling intensity changes with thickness of the exchange layer 26. Typically, the maximum AFC can be obtained at a thickness of about 0.8 nm and FC can be obtained in a range where the thickness is larger or smaller than that, though the exact number of the film thickness depends on the material and fabrication process.

<Medium Configuration—Storage Layer 25>

Figure 25:
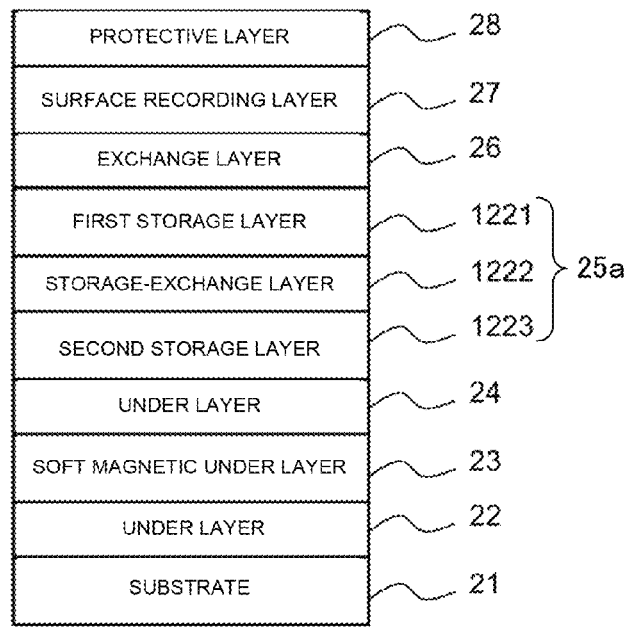
FIG. 25 is a schematic view of a stack structure of the magnetic recording medium used in the magnetic recording and reproducing method according to the embodiment.

In the magnetic recording medium 121 constituting the magnetic recording and reproducing device according to the embodiment, the storage layer 25 may have a plurality of layers. A schematic view of this medium configuration is illustrated in FIG. 25.

A storage layer 25a is composed of a second storage layer 1223, a storage-exchange layer 1222, and a first storage layer 1221 which are stacked in order. The first storage layer 1221 and the second storage layer 1223 are each composed of magnetic grains having perpendicular magnetic anisotropy and a non-magnetic matrix around the magnetic grains. The first storage layer 1221 and the second storage layer 1223 are antiferromagnetically coupled to each other via the storage-exchange layer 1222.

To induce the antiferromagnetic coupling, the storage-exchange layer 1222 is preferably a non-magnetic material having a thickness of 1.5 nm or less and containing at least one element among Ru, Ir, Re, and Rh.

Since the first storage layer 1221 and the second storage layer 1223 are antiferromagnetically coupled to each other, the total magnetization of the two layers is small. Therefore, a storage layer 25 having low magnetization and a large coercive force can be obtained. This makes the storage layer 25 difficult to reverse when the information is recorded on the surface recording layer 27. Since the leakage magnetic field from the magnetic domain 74 recorded in the storage layer 25 is reduced, the noise from the storage layer 25 during the reproducing process of the surface recording layer 27 is reduced.

It is unfavorable that both parallel and antiparallel magnetic states for the first storage layer 1221 and the second storage layer 1223 are possible under zero external magnetic field. This condition makes the transfer recording step unstable.

Figure 26:
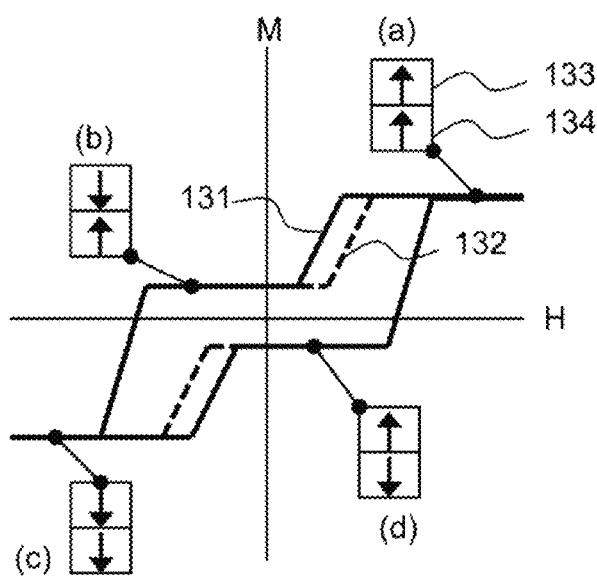
FIG. 26 is a chart illustrating an example of a hysteresis loop of the magnetic recording medium used in the magnetic recording and reproducing method according to the embodiment.

A schematic view of a hysteresis loop of the storage layer 25a (the first storage layer 1221 and the second storage layer 1223) according to the embodiment is illustrated in FIG. 26. A major loop 131 and a minor loop 132 are shown.

The minor loop 132 can be obtained as follows. A magnetic field with high strength is applied upward to achieve a magnetic state (a), then the magnetic field is decreased to zero, and then increased to downward direction to obtain a magnetic state (b). Thereafter, the downward magnetic field is decreased to zero, and then increased to upward direction back into the state (a). Thus, the minor loop 132 from the state (b) to the state (a) can be obtained.

Magnetization states 133 and 134 schematically illustrate the magnetization states of the first storage layer 1221 and the second storage layer 1223 respectively. In the state (a), magnetizations of both the first storage layer 1221 and the second storage layer 1223 are directed upward due to a strong upward external magnetic field. Thereafter, when the external magnetic field is decreased, the first storage layer 1221 is reversed into the state (b) by the strong exchange field before the magnetic field becomes downward. Accordingly, only the state (b) can stably exist in the state free from external magnetic field.

This relationship is point symmetry about a point of a magnetic field H=0 and a magnetization M=0 as illustrated in FIG. 26. In other words, even if starting from a state (c) in which both of the magnetization states are downward due to a strong downward magnetic field, when the downward magnetic field strength is decreased, the surface recording layer 27 is reversed into (d) before a zero magnetic field. Accordingly, only two magnetization states (b) and (d) exist under the zero magnetic field.

Such a hysteresis can be realized by decreasing the product of the residual magnetization and the film thickness of the first storage layer 1221 and the second storage layer 1223 or enhancing the antiferromagnetic coupling acting between the first storage layer 1221 and the second storage layer 1223.

<Medium Configuration—Surface Recording Layer>

The surface recording layer 27 may be composed of a granular layer and a continuous magnetic layer exchange-coupled to the granular layer. The granular layer has magnetic grains having perpendicular magnetic anisotropy and a non-magnetic matrix around the magnetic grains.

The surface recording layer 27 may have a so-called CGC (Continuous Granular Coupled) structure in which the granular layer and the continuous magnetic film stacked thereon are exchange-coupled to each other, as in the case of the current HDD medium.

Figure 27:
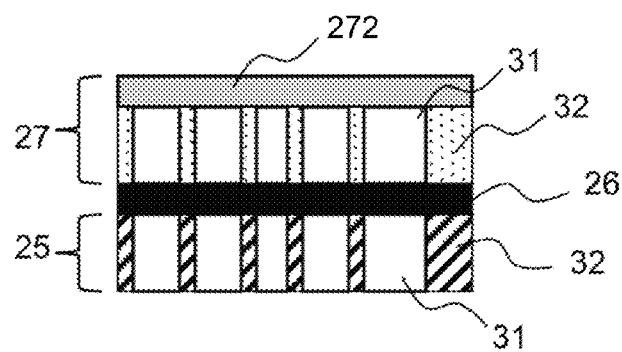
FIG. 27 is a schematic view of a cross section of an example of the magnetic recording medium.

A schematic view of a cross section of the magnetic recording medium is illustrated in FIG. 27. The surface recording layer 27 is composed of the granular layer composed of the magnetic grains 31 and the non-magnetic matrix 32 and the continuous magnetic layer 272 thereon. The magnetic grains and the continuous magnetic layer are exchange-coupled to each other. The exchange coupling may be FC or AFC. The continuous magnetic layer 272 does not need to be continuous over the entire surface of the magnetic recording medium 121. The continuous magnetic layer 272 may be partially discontinuous as in the case of the current HDD medium, as long as it can control the exchange coupling force between the magnetic grains in the granular layer.

Even in this case, since the relationship between the magnetic grains in the surface recording layer 27 and the magnetic grains in the storage layer 25 does not change, the same process as illustrated in FIG. 8A to FIG. 8G can take place. In short, the same transfer recording step and transfer reproduction step as those illustrated in FIG. 8A to FIG. 8G are carried out. Accordingly, the problems of the recording resolution and the reproduction resolution those are disadvantages of the conventional volume recording can be solved.

In addition, the surface recording layer 27 is in a so-called CGC structure, so that the exchange coupling between the magnetic grains in the surface recording layer is controlled to an appropriate value to improve the SNR. Using the magnetic recording medium 121 according to the embodiment makes it possible to improve the SNR of the volume recording.

<System—Buffering>

Information on the surface recording layer 27 may be transferred to a buffer memory before the transfer reproduction step, and data in the buffer memory may be transferred back to the surface recording layer 27 after the transfer reproduction step.

Figure 28:
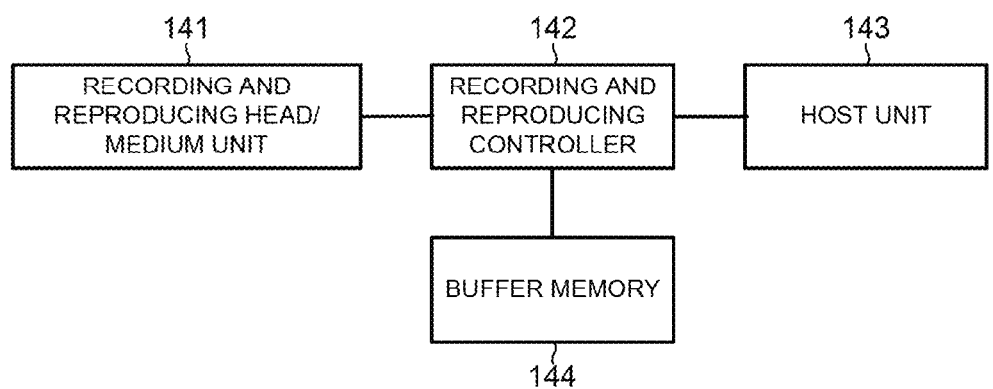
FIGS. 28 and 29 are block diagrams related to a buffer memory used in the magnetic recording and reproducing method according to the embodiment.

FIG. 28 illustrates a block diagram of the buffer memory and its nearby units of the magnetic recording and reproducing device according to the embodiment. This magnetic recording and reproducing device has a recording and reproducing head/medium unit 141, a recording and reproducing controller 142, a host unit 143 such as a PC, and a buffer memory 144.

When information is to be recorded or reproduced in the host unit 143, an instruction of a recording/reproducing operation is sent from the host unit 143 to the recording and reproducing controller 142. Then, according to the instruction, the recording and reproducing head/medium unit 141 performs a recording or reproducing operation. The result of the recording or reproducing operation is returned to the host unit 143 via the recording and reproducing controller 142.

In the magnetic recording and reproducing method according to the embodiment, before performing the transfer reproduction step for reading the information on the storage layer 25, the information on the surface recording layer 27 is reproduced first, and its result is stored (saved) in the buffer memory. Since the transfer reproduction step erases the information on the surface recording layer 27, the above operation prevents a loss of the information on the surface recording layer 27.

After the transfer reproduction step, the information in the buffer memory 144 is written again back on the surface recording layer 27. This process can recover the surface recording layer 27 back to the state before the transfer reproduction step.

When a reproduction of the information on the surface recording layer 27 is requested before the above write back process, the information is directly read from the buffer memory 144.

Information recorded on all the data area of the surface recording layer 27 is basically transferred to the buffer memory 144. However, in some cases, selected information on the surface recording layer 27 may be transferred to the buffer memory. This can reduce the total time for the transfer reproduction step.

The capacity of the buffer memory 144 needs to be the same as that of the surface recording layer 27, namely, the capacity of one surface of the magnetic recording medium 121 in the magnetic recording and reproducing device.

Figure 29:
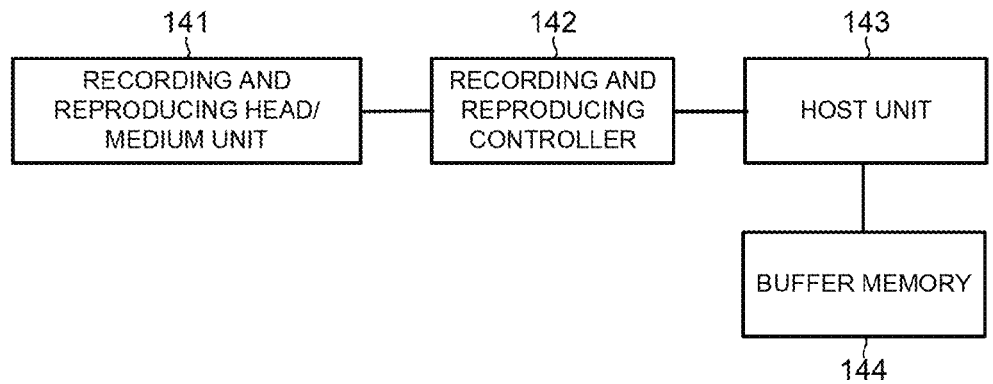

As illustrated in FIG. 29, the buffer memory 144 may be a sub unit of the host unit 143. In this case, transfer of the information on the surface recording layer 27 to the buffer memory 144 can be processed within the host unit. This simplifies the operation within the units in the drive part (the unit 141 and the controller 142). However, this may increase the processing load of the host unit and may lead to the reduction in the processing capability of the host unit such as the operations of other devices.

The timing of the data transfer from the buffer unit back to the surface recording layer 27 may be immediately after the reproducing operation instruction is sent from the host. In contrast, according to the provisioning of the timing of the next request for reproducing the information on the surface recording layer 27, the write back process to the surface recording layer 27 may be performed before receiving the reproduction request from the host. This kind of operation improves the total data processing throughput of the magnetic recording medium device and the host unit.

The timing of transfer back process may be estimated from a data usage pattern of the host unit. For example, when an access to continuous vast amounts of information such as a movie file is expected, the transfer back process can be executed immediately after the transfer reproduction step.

Alternatively, when a discrete recording/reproducing access to relatively small data, such as web access or a document file, is expected, the transfer back process may be executed after a series of recording/reproducing operations are finished. This can reduce the waiting time for reproduction.

In the magnetic recording and reproducing method according to the embodiment, another surface of the recording media in the same magnetic recording and reproducing device (drive) may be used as a buffer memory. For example, one surface and the other surface of the same magnetic recording medium can be used for recording and for buffer respectively. Alternatively, different medium surfaces of different magnetic recording media can be used for recording and for buffer respectively. In this case, one or both of the surface recording layer 27 and the storage layer 25 of the medium surfaces can be used for buffer.

As described above, arbitral surface recording layer 27 or the storage layer 25 can be a buffer memory.

In this case, the buffer memory has a capacity for at least on one surface of the magnetic recording medium 121. As compared with the case of using a flash memory as the buffer memory, the recording and reproducing operation is slow but the cost is low.

As has been described, the volume magnetic recording in which three problems have been solved can be realized by using the magnetic recording and reproducing method according to the embodiment. Any design for the recording medium and the read/write head including their modification is possible as far as satisfying the conditions mentioned above. As has been described, any design can solve the three problems as long as the above-described recording and reproducing method is performed.

One example of the magnetic recording medium 121 according to the embodiment is described below. The following example is a result of investigating the magnetization reversal process of one magnetic grain in the granular film illustrated in FIG. 5 by an LLG micromagnetics simulation. When the simulation result shows the same operation as those schematically illustrated in FIG. 8A to FIG. 8G, it is shown that the magnetization transition region can be transferred between the surface recording layer 27 and the storage layer 25 because the transition region consists of magnetic grains with the direction up or down as described before. In other words, the volume magnetic recording in which three problems in the recording resolution and so on have been solved can be realized.

A magnetic anisotropy energy density Ku of 1.5 M erg/cc, a saturation magnetization Ms of 600 emu/cc, and a thickness of 15 nm were set as the surface recording layer 27, and Ku of 4 M erg/cc, Ms of 300 emu/cc, and a thickness of 10 nm were set as the storage layer 25.

A rectangle rod with a side of 7 nm and height of 25 nm was used as a calculation model of the magnetic grain. The grain consists of a cubic unit cell having one side of 1 nm. The upper portion of the grain (upper 15 nm portion) represents the surface recording layer 27 and the lower portion (lower 10 nm portion) represents the storage layer 25. The magnetization reversal is investigated by calculating the direction of the spin at each unit cell according to the LLG equation.

The exchange stiffness coefficient A between spins within each layers (between unit cells) was set to 0.2 µerg/cm (ferromagnetic coupling), and the exchange stiffness coefficient A at the interface between the surface recording layer 27 and the storage layer 25 was set to 0.015 µerg/cm (ferromagnetic coupling). The exchange layer 26 was modeled as non-magnetic layer with the thickness of zero in this simulation. The damping constant α was set to 1.0.

Figure 30:
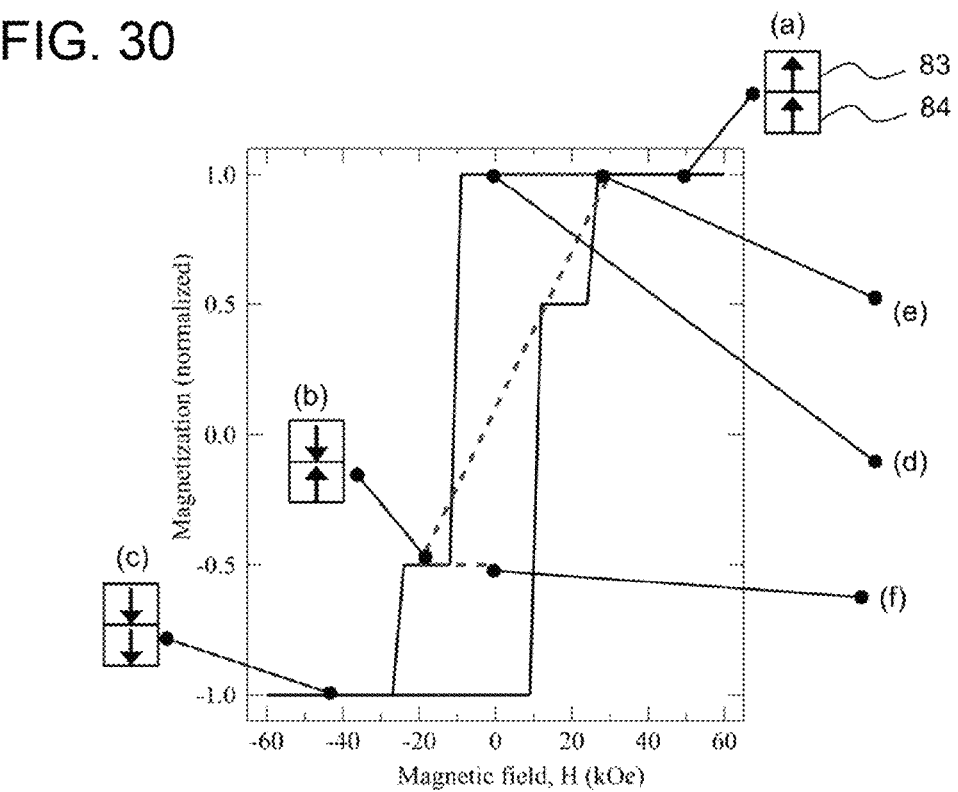
FIG. 30 is a chart illustrating a simulation result of a hysteresis loop of the magnetic recording medium used in the magnetic recording and reproducing method according to the embodiment.

Calculated hysteresis loop of this model is shown in FIG. 30. It is found that similar hysteresis loop to that illustrated in FIG. 10 is obtained.

At the state (a), both the surface recording layer 83 and the storage layer 84 are in upward magnetized states. At the state (b), only the surface recording layer 27 is reversed. At the state (c), both the surface recording layer 27 and the storage layer 25 are reversed into downward magnetized states.

Initial state of the model was set at (d) where no magnetic field is applied. An upward magnetic field was then applied to this model up to about 30 kOe (e), and then the magnetic field was decreased to about −20 kOe (b). After that, the state (f) is obtained by returning the magnetic field to zero.

This transition of the magnetization states is indicated with a dotted line.

In the state (f), the surface recording layer 27 is reversed but the storage layer 25 is not reversed. This indicates that application of a recording magnetic field of ±20 kOe makes it possible to record only on the surface recording layer 27 without changing the magnetization state of the storage layer 25.

Figure 31:
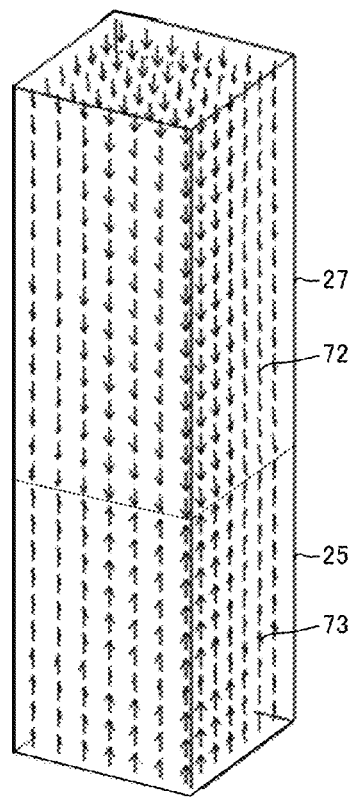
FIG. 31 is a view illustrating a simulation result of a magnetization structure of the magnetic recording medium used in the magnetic recording and reproducing method according to the embodiment.

A microscopic magnetization state in the state (f) is shown in FIG. 31. An arrow indicates the direction of the magnetization in a unit cell of 1 cubic nm. It is found that the spin is twisted (in a head-to-head state) at the interface (indicated by dotted line) between the storage layer 25 and the surface recording layer 27. This corresponds to the state of the fourth magnetic grain from the left in FIG. 8B, though the magnetization direction is opposite to this case.

Next, the transfer recording step was simulated. That is, following process schematically shown in FIG. 8C was confirmed by the LLG simulation; information different from the storage layer 25 was recorded on the surface recording layer 27, then the coercive force of the storage layer 25 is reduced, then the magnetization direction of the surface recording layer 27 is transferred to the storage layer 25.

The initial state was set to state (f) in FIG. 30. The same magnetic parameters of the surface recording layer 27 and the storage layer 25 as the above were used. Then, only Ku of the storage layer 25 was decreased. This situation corresponds to the case where the Curie temperature of the storage layer 25 is set to the value lower than that of the surface recording layer 27 and heat is applied as the external field other the magnetic field from the recording head. A magnetic field of 100 Oe was applied in the in-plane direction as the disturbance leakage magnetic field usually observed in an ordinary HDD.

Figure 32:
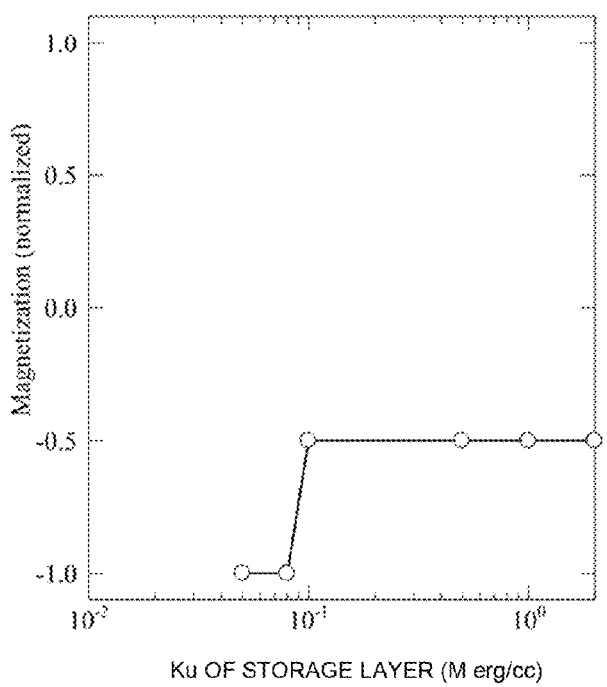
FIGS. 32 and 33 are charts illustrating simulation results of a transfer recording step of the magnetic recording and reproducing method according to the embodiment.

FIG. 32 illustrates a calculation result. The horizontal axis is Ku of the storage layer 25 and the vertical axis is the normalized magnetization. When Ku is larger than 0.1 M erg/cc, the magnetization is −0.5, that is, the initial state (the surface recording layer 27 is downward and the storage layer 25 is upward) is held unchanged. When Ku is reduced to smaller than 0.08 M erg/cc, the magnetization of the storage layer 25 was reversed (the magnetization became −1).

This indicates that the process corresponding to the states of the fourth magnetic grain (72 and 73) from the left in FIG. 8B to FIG. 8D occurs. It was shown that when the magnetic anisotropy energy density Ku of the storage layer 25 was decreased by heating from 4 M erg/cc to 0.08 M erg/cc, the transfer recording step as illustrated in FIG. 8A to FIG. 8G was realized.

In an actual transfer recording step, the disturbance field may increase due to the leakage field from outside the recording medium and the magnetic field from the recording head. Therefore, for the magnetization reversal of the storage layer 25, Ku is not necessary to be decreased to such an extent as shown above.

Next, the transfer recording step by microwave assist recording was investigated by the LLG simulation. The same magnetic parameters of the surface recording layer 27 and the storage layer 25 as the above were set. The state (f) in FIG. 30 is set to the initial state. The magnetic anisotropy energy density Ku of the storage layer 25 was reduced To ¼ (=1 M erg/cc) and its exchange stiffness coefficient A was decreased. Then, one cycle of an alternating magnetic field of ±1 kOe is applied in the in-plane direction with zero rise time.

Reduction in Ku means that the magnetization is easy to align to the direction of the external magnetic field. This situation corresponds to the microwave assisted recording where the storage layer 25 is close to a resonant state or under a large microwave magnetic field.

Further, a small exchange stiffness coefficient A means that the spin is easy to rotate, that is, the spin in the storage layer 25 rotates well following the microwave magnetic field or it is shaken well by the microwave magnetic field.

The result of the calculation showed the result when the exchange stiffness coefficient A was changed as 0.2 μerg/cm, 0.1 μerg/cm, and 0.05 μerg/cm, namely, the degree of shaking of the spin was increased. It is shown that the magnetization of the storage layer 25 was reversed when the exchange stiffness coefficient A was decreased to 0.05 μerg/cm.

Next, the transfer reproduction step was simulated.

It is clear that the transfer reproduction step can be realized for the case when the coercive force of the surface recording layer 27 is reduced by the heating or the microwave magnetic field since the situation is the same as the above-described transfer recording step except for the layer to be reversed.

The case when the in-plane magnetic field is applied for the transfer reproduction step was investigated by a simulation. The same magnetic parameters of the surface recording layer 27 and the storage layer 25 as the above were set. The state (f) in FIG. 30 is set to the initial state. The magnetic field was applied in the in-plane direction and then was removed just after the stable magnetic state is achieved.

Figure 33:
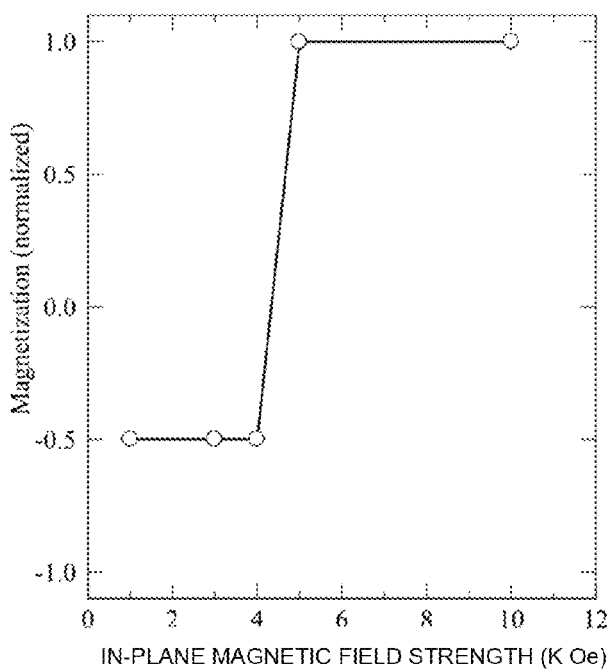

FIG. 33 shows the result. The horizontal axis is the intensity of the in-plane magnetic field, and the vertical axis is the normalized magnetization. In the initial state, the surface recording layer 27 directs downward and the storage layer 25 direct upward (magnetization is −0.5). When an in-plane magnetic field of 5 kOe or more is applied, the magnetization becomes +1. This means that only the surface recording layer 27 is reversed. In other words, the process of the fourth magnetic grain (72 and 73) from the left in FIG. 8E to FIG. 8G was confirmed.

In the foregoing, the magnetic recording and reproducing method according to the embodiment was confirmed using the LLG simulation. Examples of the volume magnetic recording in which the above-described three problems are solved are shown. By simulating the magnetization reversal of a magnetic grain constituting the storage layer 25 and the surface recording layer 27, it has been shown that the transfer recording step (the magnetization state of the surface recording layer 27 is transferred to the storage layer 25) and the transfer reproduction step (the magnetization state of the storage layer 25 is transferred to the surface recording layer 27) can be executed by effectively decreasing the coercive force or applying an in-plane magnetic field.

Since the transfer of the magnetization state takes place at each magnetic grain as described above, the magnetization transition region 71 is transferred between the surface recording layer 27 and the storage layer 25 without changing its width. That is, the volume recording in which low recording resolution problem and low reproduction resolution problem are solved is realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording and reproducing device, comprising:
  a magnetic recording medium; and
  a controller configured to control recording and reproduction of information on/from the magnetic recording medium,
  the magnetic recording medium including in sequence a substrate, a storage layer, an exchange layer, and a surface recording layer,
  the storage layer including a first magnetic grain and a first non-magnetic matrix around the first magnetic grain, the first magnetic grain having perpendicular magnetic anisotropy,
  the surface recording layer including a second magnetic grain and a second non-magnetic matrix around the second magnetic grain, the second magnetic grain having perpendicular magnetic anisotropy,
  the first and second magnetic grains having a diameter of 3 nm or more and 20 nm or less,
  the exchange layer including a magnetic metal or a non-magnetic metal and transmitting an exchange interaction between the storage layer and the surface recording layer,
  a coercive force Hcr of the surface recording layer, an exchange field Hexr applied to the surface recording layer, an external magnetic field Har applied to the surface recording layer, a coercive force Hcs of the storage layer, an exchange field Hexs applied to the storage layer, and an external magnetic field Has applied to the storage layer, satisfying following conditions at room temperature, Hcr>Hexr+Har Hcs>Hexs+Has the controller being configured to execute following steps (1) to (6):
  (1) magnetically recording first information on the surface recording layer;
  (2) transferring the first information recorded on the surface recording layer to the storage layer;
  (3) magnetically recording second information on the surface recording layer;
  (4) magnetically reproducing the second information from the surface recording layer;
  (5) transferring the first information recorded on the storage layer to the surface recording layer; and
  (6) magnetically reproducing the first information transferred to the surface recording layer.

2. The magnetic recording and reproducing device of claim 1, wherein
  a first Curie temperature of the surface recording layer is higher than a second Curie temperature of the storage layer, and in the step (2), the surface recording layer is heated to a temperature lower than the first Curie temperature to satisfy following condition, $$Hcs < Hexs + Has$$

Hcs: coercive force of the storage layer in a heated state
Hexs: exchange field applied to the storage layer
Has: an external magnetic field applied to the storage layer.

3. The magnetic recording and reproducing device of claim 2, wherein the width of a heated region of the magnetic recording medium is wider than a recording track width.

4. The magnetic recording and reproducing device of claim 1, wherein
in the step (2), a microwave magnetic field with a frequency close to a resonant frequency of the storage layer is applied to the magnetic recording medium to satisfy following condition, $$Hcs < Hexs + Has$$

Hcs: coercive force of the storage layer in a state of a microwave magnetic field being applied thereto.

5. The magnetic recording and reproducing device of claim 4, wherein the width of a region of the magnetic recording medium to which the microwave magnetic field is applied is wider than a recording track width.

6. The magnetic recording and reproducing device of claim 1, wherein
in the step (5), a microwave magnetic field with a frequency close to a resonant frequency of the surface recording layer is applied to the magnetic recording medium to satisfy following condition, $$Hcr < Hexr + Har$$

Hcr: coercive force of the surface recording layer in a state of a microwave magnetic field being applied thereto.

7. The magnetic recording and reproducing device of claim 6, wherein the width of a region of the magnetic recording medium to which the microwave magnetic field is applied is wider than a recording track width.

8. The magnetic recording and reproducing device of claim 1, wherein, in the step (5), an external magnetic field of 1 kOe or more is applied in a medium in-plane direction.

9. The magnetic recording and reproducing device of claim 8, wherein the width of a region of the magnetic recording medium to which the in-plane external magnetic field is applied is wider than a recording track width.

10. The magnetic recording and reproducing device of claim 1, wherein,
in the magnetic recording medium, a Curie temperature of the surface recording layer is lower than a Curie temperature of the storage layer, and
in the step (5), the magnetic recording medium is heated to a temperature lower than the Curie temperature of the storage layer to satisfy following condition, $$Hcr < Hexr + Har$$

Hcr: coercive force of the surface recording layer in a heated state.

11. The magnetic recording and reproducing device of claim 10, wherein the width of a heated region of the magnetic recording medium is wider than a recording track width.

12. The magnetic recording and reproducing device according to claim 1, further comprising:
a first magnetic head controlled by the controller to record or reproduce in the steps (1), (3), (4) and (6); and
a second magnetic head controlled by the controller to transfer in the steps (2) and (5).

13. The magnetic recording and reproducing device of claim 1, wherein the exchange layer of the magnetic recording medium includes a magnetic material containing at least one element among Fe, Co, and Ni.

14. The magnetic recording and reproducing device of claim 13, wherein a saturation magnetization of the exchange layer is 1000 emu/cc or more.

15. The magnetic recording and reproducing device of claim 1, wherein the exchange layer has a thickness of 1.5 nm or less and contains at least one element among Ru, Ir, Re, and Rh.

16. The magnetic recording and reproducing device of claim 1, wherein
the storage layer comprises in sequence a second storage layer, a storage exchange layer, and a first storage layer,
the first storage layer includes a third magnetic grain and a third non-magnetic matrix around the third magnetic grain, the third magnetic grain having perpendicular magnetic anisotropy,
the second storage layer has a fourth magnetic grain and a fourth non-magnetic matrix around the fourth magnetic grain, the fourth magnetic grain having perpendicular magnetic anisotropy, and
the storage exchange layer includes at least one element among Ru, Ir, Re, and Rh, has a thickness of 1.5 nm or less, and transmits an exchange interaction between the first and second storage layers.

17. The magnetic recording and reproducing device of claim 1, wherein
the surface recording layer comprises a granular layer and a continuous magnetic layer stacked on the granular layer, the granular layer includes a magnetic grain and a non-magnetic matrix around the magnetic grain, the magnetic grain has perpendicular magnetic anisotropy, and
the granular layer and the continuous magnetic layer are exchange-coupled to each other.

18. The magnetic recording and reproducing device of claim 1, the controller further executes following steps:
transferring the information on the surface recording layer to a buffer memory before the step (5); and
transferring data in the buffer memory to the surface recording layer after the step (5).

19. The magnetic recording and reproducing device of claim 18, wherein the buffer memory is
a surface recording layer or a storage layer of the magnetic recording medium or
a surface recording layer or a storage layer of a second magnetic recording medium different from the magnetic recording medium.

20. A magnetic recording and reproducing method of recording and reproducing information on/from a magnetic recording medium,
the magnetic recording medium including in sequence a substrate, a storage layer, an exchange layer, and a surface recording layer,
the storage layer including a first magnetic grain and a first non-magnetic matrix around the first magnetic grain, the first magnetic grain having perpendicular magnetic anisotropy,
the surface recording layer including a second magnetic grain and a second non-magnetic matrix around the second magnetic grain, the second magnetic grain having perpendicular magnetic anisotropy, the exchange layer including a magnetic metal or a non-magnetic metal and transmitting an exchange interaction between the storage layer and the surface recording layer, a coercive force Hcr of the surface recording layer, an exchange field Hexr applied to the surface recording layer, an external magnetic field Har applied to the surface recording layer, a coercive force Hcs of the storage layer, an exchange field Hexs applied to the storage layer, and an external magnetic field Has applied to the storage layer, satisfying following conditions at room temperature, Hcr>Hexr+Har Hcs>Hexs+Has the method comprising following steps (1) to (6):
(1) magnetically recording first information on the surface recording layer;
(2) transferring the first information recorded on the surface recording layer to the storage layer;
(3) magnetically recording second information on the surface recording layer;
(4) magnetically reproducing the second information from the surface recording layer;
(5) transferring the first information recorded on the storage layer to the surface recording layer; and
(6) magnetically reproducing the first information transferred to the surface recording layer.

* * * * *